(12) United States Patent
O'Doherty

(10) Patent No.: US 12,079,176 B2
(45) Date of Patent: Sep. 3, 2024

(54) DEVICE, A METHOD OF PERFORMING A FILE TRANSACTION, AND A METHOD OF PERFORMING AN ACCESS OPERATION

(71) Applicant: nCipher Security Limited, Cambridge (GB)

(72) Inventor: David O'Doherty, Cambridge (GB)

(73) Assignee: NCIPHER SECURITY LIMITED, Cambridge (GB)

( * ) Notice: Subject to any disclaimer, the term of this patent is extended or adjusted under 35 U.S.C. 154(b) by 6 days.

(21) Appl. No.: 17/917,736

(22) PCT Filed: Apr. 6, 2021

(86) PCT No.: PCT/GB2021/050851
§ 371 (c)(1),
(2) Date: Oct. 7, 2022

(87) PCT Pub. No.: WO2021/205164
PCT Pub. Date: Oct. 14, 2021

(65) Prior Publication Data
US 2023/0161740 A1    May 25, 2023

(30) Foreign Application Priority Data

Apr. 8, 2020 (GB) .................................... 2005235
Jul. 21, 2020 (EP) .................................... 20187061

(51) Int. Cl.
*G06F 16/18* (2019.01)
*G06F 16/16* (2019.01)
*G06F 16/17* (2019.01)

(52) U.S. Cl.
CPC ........ *G06F 16/1865* (2019.01); *G06F 16/162* (2019.01); *G06F 16/1727* (2019.01)

(58) Field of Classification Search
CPC . G06F 16/1865; G06F 16/162; G06F 16/1727
See application file for complete search history.

(56) References Cited

U.S. PATENT DOCUMENTS 5,559,957 A * 9/1996 Balk .................... G06F 11/1435
714/E11.136
5,584,014 A * 12/1996 Nayfeh ................. G06F 12/126
711/134

(Continued)

FOREIGN PATENT DOCUMENTS

EP    1089177 A2 *  4/2001  ......... G06F 16/1865
EP    1276271 A1    1/2003

OTHER PUBLICATIONS

Indian First Examination Report received for Indian Serial No. 202217063677 on Mar. 8, 2023, 6 pgs.

(Continued)

*Primary Examiner* — Mark D Featherstone
*Assistant Examiner* — Kweku William Halm
(74) *Attorney, Agent, or Firm* — Merchant & Gould P.C.

(57) ABSTRACT

A method of performing a file transaction, the method comprising: providing a transaction instruction to perform a set of one or more transaction operations on a device; responsive to determining the transaction instruction comprises one or more write transaction operations, wherein the one or more write transaction operations collectively relate to a first file group comprising at least one file object, the first file group has a first size, and each of the at least one file objects comprises identification information, if the first size does not exceed available device storage: writing each of the at least one file objects with an uncommitted file type; after the first file group is written, storing transaction information on the device storage indicating that the transaction is committed; responsive to determining that one or more pre-existing file objects share identification information with any of the first file group, erasing the one or more pre-existing file objects; updating the type of each of the at least one file objects in the first file group to a finalised type.

15 Claims, 7 Drawing Sheets

(56) References Cited

U.S. PATENT DOCUMENTS

| | | |
|---|---|---|
| 9,811,532 B2 | 7/2017 | Parkison |
| 2014/0006354 A1* | 1/2014 | Parkison .............. G06F 3/0635 |
| | | 707/661 |
| 2018/0300354 A1* | 10/2018 | Liang ................... G06F 16/182 |

OTHER PUBLICATIONS

"Database File Format", SQLite; retrieved online Feb. 25, 2020 (https://www.sqlite.org/fileformat.html, 31 pages).
"Dataliight ®"; retrieved online Oct. 2, 2019 (https://www.datalight.com/products/embedded-file-systems, 3 pages).
Search Report for European Patent Application No. 20187061.5 (Dec. 9, 2020).
International Preliminary Report on Patentability for PCT/GB2021/050851 (Oct. 6, 2022).
International Search Report for PCT/GB2021/050851 (Jun. 10, 2021).

\* cited by examiner

| Storage address (decimal) | Object | Field | Field description | Field bytes (hexadecimal) |
|---|---|---|---|---|
| 0 | FS_Header (Filesystem header) | FS_Type | Formatted non-dirty state | 0x01 |
| 1 | | FS_Len2 | Alternate length (not in use) | 0x0000 |
| 3 | | FS_FragmentIndex | Fragment index (not in use) | 0x000000000000000 |
| 10 | Entry_Block (File /a/1 with content "Example 1") | Entry_Type | ETYPE_FILE (file) type | 0x03 |
| 11 | | Entry_Len | Entry length of 17 (little endian) | 0x1100 |
| 13 | | Entry_NameLen | Filename length of 4 (NB 0x00=1) | 0x03 |
| 14 | | Entry_Name | Filename "/a/1" | 0x2f612f31 |
| 18 | | Entry_Content | File content "Example 1" | 0x4578616d706c652031 |
| 27 | Entry_Block (256 bytes free space) | Entry_Type | ETYPE_FREESPACE (free space) type | 0x02 |
| 28 | | Entry_Len | Entry length of 256 (little endian) | 0x0001 |
| 30 | | Entry_Content | Zero bytes for all remaining free space | 0x0000 … 00 |
| 283 | Entry_Block (File /b/2 with content "Example 2") | Entry_Type | ETYPE_FILE (file) type | 0x03 |
| 284 | | Entry_Len | Entry length of 17 (little endian) | 0x1100 |
| 286 | | Entry_NameLen | Filename length of 4 (NB 0x00=1) | 0x03 |
| 287 | | Entry_Name | Filename "/b/2" | 0x2f622f32 |
| 291 | | Entry_Content | File content "Example 2" | 0x4578616d706c652032 |
| 300 | Entry_Block (remaining storage space) | Entry_Type | ETYPE_FREESPACE (free space) type | 0x02 |
| 301 | | Entry_Len | Entry length of 724 (little endian) | 0xd402 |
| 303 | | Entry_Content | Zero bytes for all remaining free space | 0x0000 … 00 |
| [1024] | | | | |

FIG. 3

DEVICE, A METHOD OF PERFORMING A FILE TRANSACTION, AND A METHOD OF PERFORMING AN ACCESS OPERATION

This application is a National Stage Application of PCT/GB2021/050851, filed Apr. 6, 2021, which claims benefit of priority to British Patent Application No. 2005235.3, filed Apr. 8, 2020, and European Patent Application No. 20187061.5, filed Jul. 21, 2020, and which applications are incorporated herein by reference. To the extent appropriate, a claim of priority is made to each of the above disclosed applications.

TECHNICAL FIELD

The present invention relates to a device, a method of performing a file transaction, and a method of performing an access operation.

BACKGROUND

Computing devices contain a form of persistent or non-volatile storage used to store information, as well as to store firmware for the device operation. A hardware security module (HSM) is an example of a computing device. Persistent storage media may also exist independently of a computing device, for example, in a physical authentication token such as a smartcard used for storage of information. Changes may be applied to the information stored in a file system on the storage within such devices, for example, a transaction to erase, write or overwrite information stored on the device. Devices such as hardware security modules and smartcards may store sensitive information, such as cryptographic keys. Where a transaction on such a device is interrupted midway through completion, it may result in the file system being left in an intermediate state, for example with only some files or only part of a file having been erased, written or overwritten. For example, if a network connection is lost whilst a transaction is in progress, a transaction failure may occur leaving the file system in an intermediate state.

Devices such as HSMs and smartcards may contain small footprint storage media, for example having a total storage capacity of less than 1 megabyte (MB), or even less than 64 kilobytes (KB). For example, authentication tokens, such as smartcards, may contain small footprint storage of 1 to 10 KB. There is a need to provide mechanisms to mitigate transaction failures which are suitable for use in such small footprint devices.

BRIEF DESCRIPTION OF THE FIGURES

Devices and methods in accordance with non-limiting embodiments will now be described with reference to the accompanying figures in which:

FIG. 3 illustrates a structure of a filesystem stored on a device in accordance with an embodiment;

DETAILED DESCRIPTION

Figure 1A:
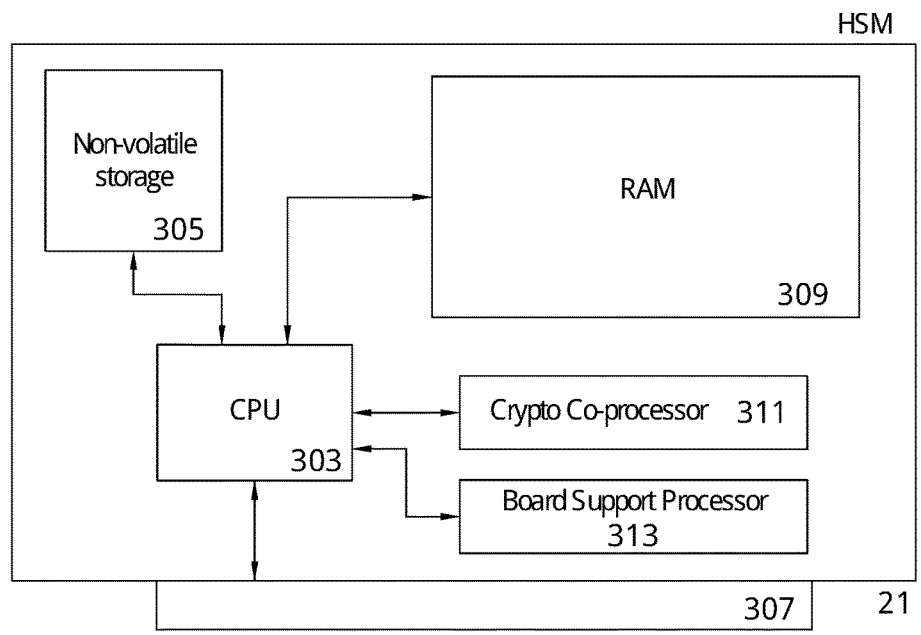
FIG. 1(a) is a schematic illustration of a device in accordance with an embodiment, wherein the device is a hardware security module.

In a first aspect, there is provided a method of performing a file transaction, the method comprising:
providing a transaction instruction to perform a set of one or more transaction operations on a device;
responsive to determining the transaction instruction comprises one or more write transaction operations, wherein the one or more write transaction operations collectively relate to a first file group comprising at least one file object, the first file group has a first size, and each of the at least one file objects comprises identification information, if the first size does not exceed available device storage:
  writing each of the at least one file objects with an uncommitted file type;
  after the first file group is written, storing transaction information on the device storage indicating that the transaction is committed;
  responsive to determining that one or more pre-existing file objects share identification information with any of the first file group, erasing the one or more pre-existing file objects;
  updating the type of each of the at least one file objects in the first file group to a finalised type.

As has been described above, where a file transaction on a device is interrupted midway through completion, it may result in the file system being left in an intermediate state, for example with only some files or only part of a file written or overwritten. For example, updates to smartcard filesystems carried out remotely over a secure network connection may be interrupted if a network connection is lost, or either the client or HSM end of the connection were removed or switched off. The above described method provides improved transaction-safety, since the transaction is not considered committed until all of the content, or replacement content if updating one or more files, has been written. This allows the filesystem to be recovered in the event of an interruption, since the transaction may be rolled forward (if committed) or rolled back (if not committed). The method enables automatic recovery of the filesystem to a consistent state after a failure. The method therefore mitigates against loss of data in failure scenarios.

Furthermore, the method is suitable for use in a small footprint filesystem. By writing each of the at least one file objects with an uncommitted file type, and then, after the first file group is written, storing transaction information on the device indicating that the transaction instruction is committed, progress of the transaction is logged without storage of a separate 'transaction log'. This makes the method particularly suited to smartcards for example, which may have storage of 1 to 10 KB, or other small secure storage areas on a hardware device.

In an embodiment, the method further comprises determining whether the first size exceeds an available storage on the device. Optionally, if the file size to be written does exceed an available storage on the device, a transaction with a downgraded transaction safety may be performed, e.g. so that safety is only per file, rather than per group of files. In this case, the method may further comprise performing a first determination of whether there is sufficient space to write a file object; responsive to determining that there is sufficient space to write the file object, writing the file object; responsive to determining that there is not sufficient space to write the file object: storing transaction information on the device indicating that a transaction is committed; determining whether any pre-existing file objects share identification information with any of first file group which have been written with an uncommitted file type, and responsive to determining that one or more pre-existing file objects share identification information, erasing the one or more of the pre-existing file objects; performing a second determination of whether there is sufficient space to write the file object; responsive to determining that there is sufficient space to write the file object in the second determination, writing the file object.

A further downgraded transaction safety level may optionally be applied, where an overwritten file may be erased first to free up space. Responsive to determining that there is not sufficient space to write the file object in the second determination, the method may further comprise: determining whether any pre-existing file object shares identification information with the file object, and responsive to determining that a pre-existing file object shares identification information, erasing the pre-existing file object; and writing the data in the file object. This drop-down approach to a lower consistency level where there is insufficient space for the full consistency to be applied means that transaction behaviour need not limit the effective storage space.

Files not included in a transaction instruction will not be marked as uncommitted at any point. The only changes to files not included in a transaction instruction will be to move them if compacting the filesystem.

Transaction progress can be indicated using a system of flags, applied in well-defined sequences, so that an interrupted transaction in the filesystem can either be rolled forward or backwards. A flag may be used to indicate a committed transaction. According to an embodiment, the method further comprises clearing the committed flag after the type of each of the at least one file objects is updated to a finalised type. The method may further comprise setting a progress flag indicating a file transaction is in progress. The flags may be updated in such a way that a 'corrupted' filesystem is not readable by a malicious user, including formatting in such a way as to ensure that an interrupted format is detectable. For example, during a format, the 'type' of the filesystem in general can be set to zero in a general filesystem header, which would indicate a corrupt filesystem to a user. Furthermore, values other than zero (e.g., 0xFF in hexadecimal), may be used to indicate an unformatted and/or corrupt filesystem.

Alternatively, storing transaction information indicating that the transactions are committed comprises updating the type of each of the at least one file objects to a committed type.

The method may also mitigate against other interruption issues such as removing a smartcard from a reader during a write, power failure, disconnection of a card reader cable during a write, or a software crash in the smartcard or in the HSM during a write.

A failure may occur whereby an individual byte write fails. The above described method provides a mechanism whereby files are not considered committed until all of their content, or replacement content if updating a file, has been written.

Interruption of a transaction may result in a corrupt filesystem, whereby the filesystem can no longer be navigated e.g. due to file headers being corrupt due to an interrupted change. For example, where the files have their lengths stored in the file header, if that is corrupted the locations of subsequent files in memory would not be known. Furthermore, a failure may occur whereby an individual byte write fails. In this case, a corrupt file might arise due to only part of the file being written for example. A corrupt file might arise due to a partial update being applied if there is an existing file, or due to only part of the file being written if it is a new file. Filesystem-level corruption due to interrupted header updates or interrupted compacting of the filesystem to free up space could also result in apparently readable files with the wrong content.

In an embodiment, updating of a file header comprises storing a redundant copy of the file length. For example, a procedure for updating of a file header may comprise storing a first copy of the new file length, storing information indicating that the header length is uncommitted for the file, and updating the file header with the new file length. The information is then changed to no longer indicate that the header length is uncommitted after the file header is updated. If an interruption occurs, the file header can be rolled forward if the information indicating the header length is uncommitted is stored, based on the first copy of the new file length. The first copy of the new file length may be stored in the filesystem header for example. In this way, file header updates are written so that interruption when writing any given byte does not result in a malformed filesystem or one where the wrong content appears to be present in a file. Furthermore, no files not included in a transaction can be lost since file header updates are performed in a manner that means the filesystem can still be navigated if a change was interrupted. Improved availability is provided by mitigating against corrupt files or a corrupt filesystem on a storage device. Improved security is also provided due to resistance to malicious corruption of storage contents by attackers. The scheme mitigates against corruption that could be done maliciously to cause incorrect data to be read by a secure system.

In an embodiment, the underpinning system will write individual bytes atomically and the ordering between writes will be preserved. No assumption is made on the order of writing multiple bytes in a single write operation.

In an embodiment, writing a file object with an uncommitted file type comprises searching for any freespace blocks having a size greater than or equal to the file object, responsive to finding two or more freespace blocks, selecting the free space block having the least excess available space which, when written to, would not result in a remaining space block below a minimum size. Responsive to finding no freespace blocks, a compaction method may be performed. A compaction method may comprise: moving a pre-existing file object of length L; storing information specifying an entry type of the entry being moved, the offset of the original start, F2, of the entry data relative to the new start, F1, of the entry, and the length of data which has been successfully moved, M, where M is initially set to zero; wherein moving the pre-existing file comprises: i. writing the next X bytes of the entry starting at address F1+M, where X is the minimum chosen from: the offset and (L-M), ii. updating the value of M stored in the fragment index; iii. set M=M+X and repeat steps i to iii until M is equal to L. The compacting algorithm is performed in a manner that mitigates against loss of data in the event of interruption. All file contents are recoverable even if they are in two fragments during the move.

In an embodiment, the method provides to avoid loss of a file that is updated in a transaction when the update to that file is a redundant no-op, since the existing file data is read and compared to the new data. If they are the same, they are removed from the list of files actually processed.

In an embodiment, erasing the one or more of the pre-existing file objects comprises: updating an entry type of the pre-existing file object to indicate an uncommitted freespace type, overwriting the pre-existing file object with zeros; and updating the entry type to indicate a freespace type. The method may further comprise, responsive to determining that newly formed freespace is adjacent to one or more further freespace entries, coalescing said adjacent entries to form a single freespace entry.

In an embodiment, the method further comprises, responsive to determining that the transaction instruction comprises one or more erase transaction operations, the one or more erase transaction operations collectively relating to a second file group to be erased from the device, the second file group comprising at least one file object, updating each of the at least one file objects in the second file group to an uncommitted erase type; and after the second file group is updated to an uncommitted erase type, storing transaction information on the device indicating that a transaction is committed; erasing the first file group. Storing the transaction information indicating that a transaction is committed may comprise setting a committed flag, and wherein the method further comprises clearing the committed flag after erasing the first file group. If the transaction instruction comprises one or more write transaction operations and one or more erase transaction operations, the transaction information indicating that the transaction is committed is stored after the first file group is written and after the second file group is updated to an uncommitted erase type.

According to another aspect, there is provided a method of performing an access operation, the method comprising:
determining whether a device stores transaction information indicating that a transaction is committed;
determining whether there are any file objects having an uncommitted file type;
responsive to determining that the device stores transaction information indicating that a transaction is committed and there are one or more file objects having an uncommitted file type, updating the type of the one or more file objects having an uncommitted file type to a finalised type; and
responsive to determining that the device does not store transaction information indicating that a transaction is committed and there are one or more file objects having an uncommitted file type, erasing the files having an uncommitted file type.

Where a process in a file system in devices such as HSMs or smartcards is interrupted midway through completion, the file system may become susceptible to a malicious attack. For example, where a format procedure is interrupted, this may mean that not all data is erased. Maliciously ordered and timed updates to a filesystem on a storage device could cause attacker-controlled corruption that either leaks secrets, bypasses access controls or causes corruption of the rest of the device. The recovery procedure mitigates against such attacks, by automatically rolling forward or back an interrupted procedure when access is attempted.

In an embodiment, responsive to determining that the device stores transaction information indicating that a transaction is committed and there are one or more file objects having an uncommitted file type: and responsive to determining that one or more pre-existing file objects share identification information with any of the files having an uncommitted file type, erasing the one or more of the pre-existing file objects.

In an embodiment, the method further comprises determining whether a flag indicates a transaction is in progress, and wherein if it is determined that the flag indicates a transaction is not in progress, determination of whether the device stores transaction information indicating that a transaction is committed and whether there are any file objects having an uncommitted file type are not performed. In an embodiment, the method further comprises determining whether one or more flags indicate a valid state of the device; and responsive to determining that the state of the device is not valid, returning an error.

In an embodiment, the method further comprises determining whether there are any file objects having an uncommitted erase type, and responsive to determining that the device stores transaction information indicating that a transaction is committed and that one or more file objects have an uncommitted erase type, erasing the one or more file objects having an uncommitted erase type. In an embodiment, responsive to determining that the device does not store transaction information indicating that a transaction instruction is committed and that one or more file objects have an uncommitted erase type, the method further comprises restoring the one or more file objects to a finalised type.

The methods define a new "uncommitted file" type and "uncommitted erase file" type. This mitigates against corrupt files being readable when an interrupted filesystem state is read by an earlier version of the filesystem.

According to another aspect there is provided a non-transitory data carrier carrying processor control code to, when running, cause a computer to perform the above described methods. The methods are computer-implemented methods. Since some methods in accordance with embodiments can be implemented by software, some embodiments encompass computer code provided on any suitable carrier medium. The carrier medium can comprise any storage medium such as a CD ROM, a magnetic device or a programmable memory device, or any transient medium such as any signal e.g. an electrical, optical or microwave signal. The carrier medium may comprise a non-transitory computer readable storage medium.

According to another aspect, there is provided a device, comprising:
one or more processors configured to:
provide a transaction instruction to perform a set of one or more transaction operations on a device storage located on the device or on another device;
responsive to determining the transaction instruction comprises one or more write transaction operations, wherein the one or more write transaction operations collectively relate to a first file group comprising at least one file object, the first file group has a first size, and each of the at least one file objects comprises identification information, if the first size does not exceed the available device storage:
write each of the at least one file objects with an uncommitted file type;
after the first file group is written, store transaction information on the device storage indicating that the transaction is committed;

responsive to determining that one or more pre-existing file objects share identification information with any of the first file group, erase the one or more pre-existing file objects;

update the type of each of the at least one file objects in the first file group to a finalised type.

According to another aspect, there is provided a device, comprising:

one or more processors configured to:

determine whether a device storage stores transaction information indicating that a transaction is committed, wherein the device storage is located on the device or on another device;

determine whether there are any file objects having an uncommitted file type;

responsive to determining that the device stores transaction information indicating that a transaction is committed and there are one or more file objects having an uncommitted file type, update the type of the one or more file objects having an uncommitted file type to a finalised type; and responsive to determining that the device does not store transaction information indicating that a transaction is committed and there are one or more file objects having an uncommitted file type, erase the files having an uncommitted file type.

The device may be a hardware security module. The device storage may be located on the hardware security module, or in a separate device such as a smartcard. In an embodiment, the device storage is persistent storage. In an embodiment, the device is a secure device.

FIG. 1(a) is a schematic illustration of a hardware security module (HSM) 21 device according to an embodiment. A HSM is a device that securely stores and manages cryptographic keys, and performs a set of cryptographic functions. A HSM may comprise both physical and non-physical properties that provide security. Non-physical security properties can include the use of encryption, i.e. the inclusion in the device of software or a physical component to perform encryption of the stored data. Physical security properties can include tamper switches triggered by physical access, and a tamper proof membrane surrounding the physical boundary of the device for example.

The HSM 21 comprises non-volatile or persistent storage 305. The storage 305 stores information, such as cryptographic keys, and programs. The non-volatile storage 305 may include any form of non-volatile device memory such as flash, optical disks or magnetic hard drives for example. The non-volatile memory 305 may be physically secure and may be resistant to tamper by a third party, for example by the inclusion of physical security such as a membrane that covers the entire device, that cannot be removed without destroying the underlying physical hardware.

The HSM 21 further comprises processor or CPU 303 which is configured to execute programs stored in the non-volatile memory 305. One or more programs may be referred to as "firmware", however generally the programs comprise a set of computer instructions stored in the non-volatile memory 305. The computer instructions, or firmware, may be written in any of a number of programming languages. The firmware comprises computer instructions embodying one or more of the methods as described herein. The firmware may further comprise computer instructions embodying one or more of the following cryptographic functions for example: cryptographic key generation; key derivation; encryption; decryption; and digital signature functions (for example digital signing or validation of a digital signature).

The CPU 303 is in wired bi-directional communication with the non-volatile storage 305 and in wired bi-directional communication with working memory or RAM 309. RAM 309 corresponds to the operating memory of the CPU 303. The processor 303 comprises logic circuitry that responds to and processes the instructions in code stored in the working memory 309. In particular, when executed, a program is represented as a software product, or process, stored in the working memory 309. The firmware can be embedded in the hardware security module when manufactured, or can be provided, as a whole or in part, after manufacture. For instance, the firmware can be introduced as a computer program product, which may be in the form of a download. Alternatively, modifications to existing firmware can be made by an update, or plug-in. Execution of various programs by the processor 303 will cause methods as described herein to be implemented.

The HSM device 21 may comprise further components, such as a board support processor 313. Board support processor 313 is configured to communicate with a plurality of on-board sensors, monitoring the operation of the main CPU and the other hardware components of the hardware security module 21. The sensors may include but are not limited to CPU and/or board temperature sensors, voltage and/or current sensors. In this example, the HSM device 21 further comprises a crypto co-processor 311, which is configured to perform certain cryptographic functions instead of the CPU 303.

Application keys associated with a client are used to perform one or more cryptographic functions embodied in the firmware on the HSM 21. When a client request in the form of a command is received at the HSM 21, the relevant application key or keys are retrieved and loaded into the RAM space of the firmware process. They may then be used by the hardware security module 21 to perform one or more cryptographic operations as have been described above. These keys may be stored on the HSM device 21 in the non-volatile storage 305. Alternatively, these keys may be stored in an encrypted manner externally to the HSM device 21, and loaded onto the HSM device when required for performing a particular cryptographic operation. For example, the keys belonging to applications may be stored on a smart card. For greater security, keys may be encrypted by an HSM key, and subsequently split across multiple smart cards using secret sharing schemes that allow a quorum of the cards to reconstruct the original key (e.g. there may be 5 cards with portions of the key, and any 3 have enough information to reconstruct the key). The portion of key information on each smart card is referred to as a "share".

Figure 1B:
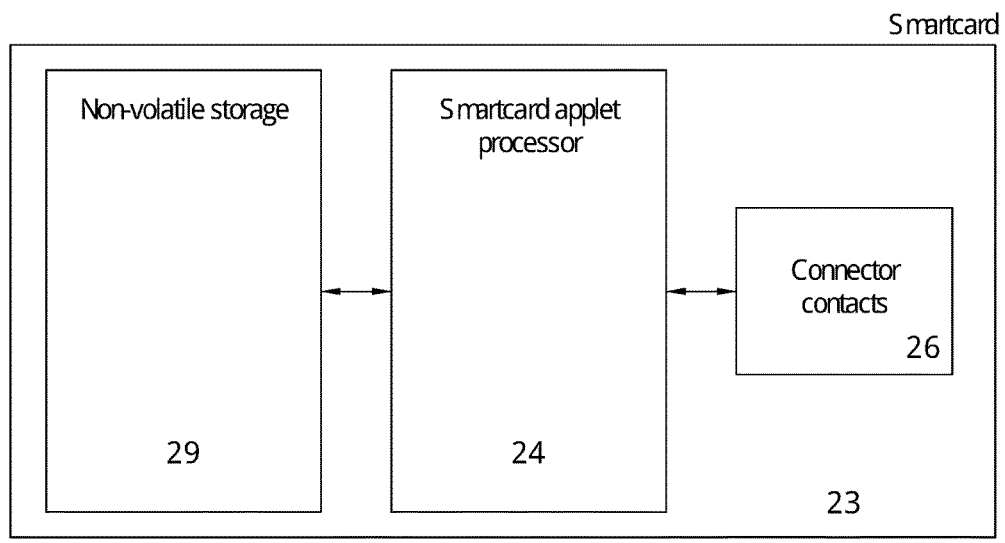
FIG. 1(b) is a schematic illustration of an example smart card device.

FIG. 1(b) is a schematic illustration of an example smartcard device 23 which may be included in a system according to an embodiment. The smart card device 23 comprises non-volatile or persistent storage 29. The storage 29 stores information, such as cryptographic keys. The non-volatile storage 29 may include any form of non-volatile device memory such as flash, optical disks or magnetic hard drives for example. The smartcard applet processor 24, which is optionally present on some smartcards, represents any processing control that exists between the connector contacts 26 and the storage. The applet processor 24 may be fixed circuitry, or a small programmable environment for example. Where the smart card is being used remotely (e.g. smartcard 23 in FIG. 2) this applet processor 24 contains the logic for terminating one end of the secure communication channel with the HSM. With a smart card inserted locally into an HSM, the communication may or may not be done over a secure channel.

Figure 2:
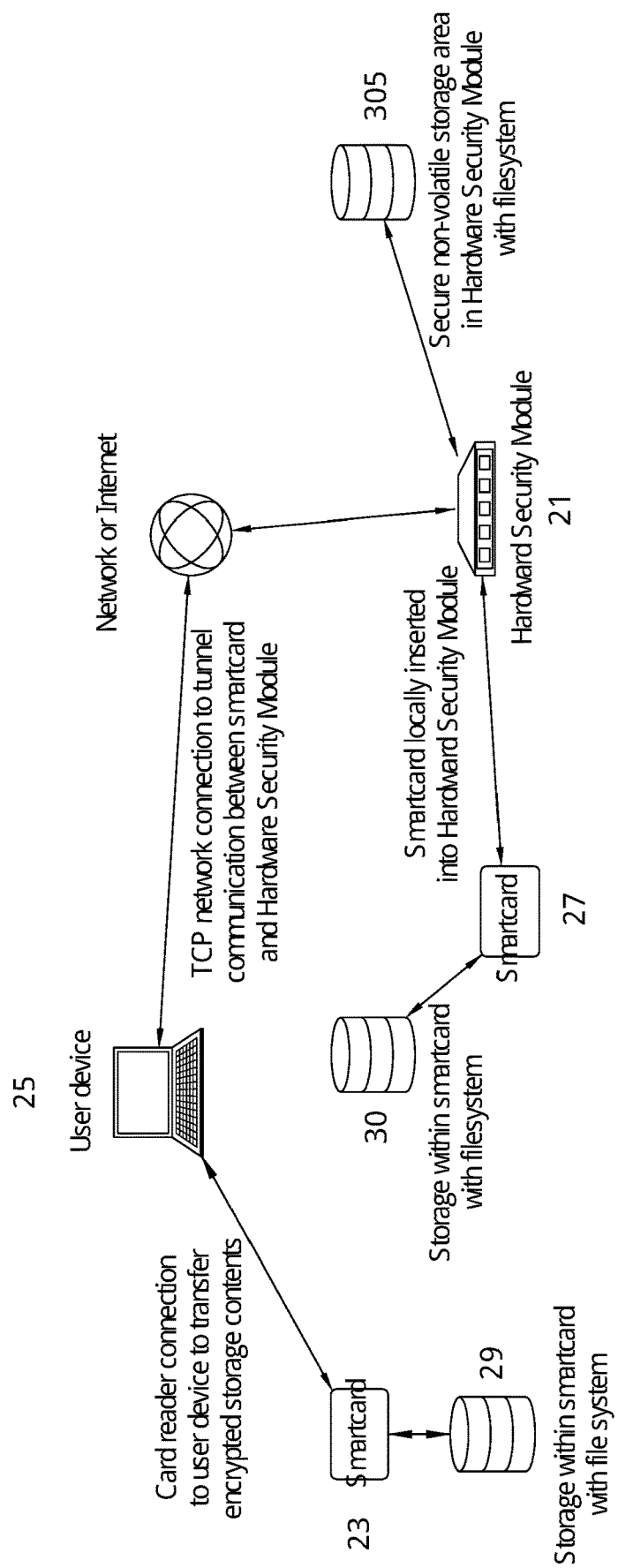
FIG. 2 is a schematic illustration of a system comprising a hardware security module device and a smart card device in accordance with an embodiment.

FIG. 2 shows a schematic illustration of a system according to an embodiment, comprising a HSM device 21 and a first smart card device 23 belonging to a client. The system further comprises a client device, user device 25. The user device 25 may be a general purpose computer. Such an arrangement may be used when the first smart card 23 and user device 25 are in a first location whereas the HSM 21 is in a second location, remote from the first location. The second location may be a host system, for example a cloud service provider system.

Also illustrated is a second smart card device 27 locally inserted into the HSM device 21. Such an arrangement may be used for HSMs directly placed inside or plugged into a client PC or server that is directly under client control for example.

The second smart card 27 may be provided instead of the first smart card 23, or in addition to the first smart card 23 as shown in the figure.

The figure illustrates various ways in which a HSM device 21 may perform access operations and file transactions as described in relation to the methods below on device storage. In particular, the HSM device 21 may perform access operations and file transactions on a remote smart card, such as on the first smart card device storage 29. The HSM device 21 may additionally or alternatively perform access operations and file transactions on a locally inserted smart card, such as on the second smart card device storage 30. The HSM device 21 may also perform access operations and file transactions on the local HSM storage 305.

The algorithms described below execute on the HSM device 21, where smartcard storage is seen as memory to read from and write to through some implementation-specific interface. This might be a virtual mapping of the smart card device memory, so that it can transparently be written to in implementation code in the same way as the HSM would write to local RAM. Device read and write functions provided by a lower layer which accept or return a byteblock and take a memory address (and length to read if reading) as a parameter may be used, where the lower layer translates those reads and writes into the appropriate device-specific operations for the underlying HSM local storage or smart card device type in question. It will be understood by the skilled person that in practice there will be one or more layers of code and communication between the algorithms described herein and the device storage in order to support the implementation of the read and write operations, such as device drivers on the HSM and small amounts of support code running on a smart card for example. More sophisticated smartcards, such as JavaCards that are themselves capable of running programs, are still treated as memory to be written to and read from by the HSM, and the code relating to the algorithms described herein is executed on the HSM itself. Such smartcards may have logic for setting up secure communication with the HSM, but this does not impact the performance of the algorithms described below.

It is further noted that whenever the algorithms specify that a read from storage takes place, this may actually be reading from a cache in the HSM memory if the implementation has already read that portion of storage, or has previously written that portion of storage. Any such cache would be invalidated when the storage device were removed if it is a removable storage device such as a smart card.

It is further noted that whenever the algorithms specify that a write takes place, this is required to be a synchronous operation, so that when the write operation reports back that it has completed successfully, the specified bytes will have been written to the actual underlying storage successfully and not merely to a cache. No assumptions are made about the intermediate state of the writes (e.g. the individual bytes in the byteblock being written could be written from highest address to lowest address rather than the reverse, or in chunks), provided that any individual byte that is written is written atomically, i.e. any individual byte is either one that the algorithm asked to be written or else it is not written at all, but never a corrupt byte.

The first smart card 23 comprises first smart card storage 29 which stores a first filesystem. The second smart card 27 comprises second smart card storage 30 which stores a second filesystem. The HSM 21 comprises a secure non-volatile storage area 305 which stores a third filesystem 31. The filesystem stored on each of the first smart card 23, second smart card 27 and HSM 21 is a filesystem used for the storage and retrieval of data, such as cryptographic keys for example. Storage on the smart cards 23 and 27 and HSM 21 may have sizes ranging from hundreds of bytes to around 64 KB for example.

The first smart card 23 is inserted into a card reader connected to the user device 25. The first smart card 23 uses its own application to establish a secure channel of communication to the HSM 21. The card reader connection to the user device 25 allows storage contents to be transferred to and from the smart card 23. The HSM 21 may be communicatively coupled to a computer or server device in the host system (not shown) through interface 307, which comprises a communication link. For example, it may comprise a USB connector, or the HSM device 21 can be a PCI express card directly plugged into the computer or server device. Communication between the user device 25 and the host system may be performed via an Internet connection. A TCP network connection is used to tunnel communication between the first smart card 23 and the HSM 21, via the user device 25 and a device in the host system (not shown). The PCI Express or USB connector in interface 307 is used for communication with the HSM device 21, included sending commands and receiving replies, and as the conduit for any network communication such as with remote smart cards with which the HSM communicates over an encrypted and authenticated secure channel. The PCI Express or USB connection would be made to a host PC or server. A host server can also be a tamper-evident chassis provided with the HSM and not user-serviceable.

The second smartcard 27 is locally inserted into the HSM 21. The HSM may have a separate serial connector for a locally attached smart card reader, which may be an external reader plugged in to a socket on the HSM by a user, or may be embedded in a surrounding chassis around the HSM and not plugged in by a user. The locally attached reader may support less sophisticated smart card types (that are largely dumb storage) as well as smart cards that have their own application running on them to establish a secure channel of communication to the HSM. Less sophisticated smartcards are not used remotely as they are not capable of making such a secure channel.

In an example, an overwrite transaction is performed to overwrite files stored in the filesystem on the first smart card 23. For example, changing a passphrase on the first smartcard 23 involves replacing existing files stored on the first smartcard 23 with new files encrypted with the new passphrase. This may be performed using an overwrite transaction as will be described herein.

Execution of various programs by the processor 303 on the HSM 21 will cause methods as described herein to be implemented, in order to execute transactions on the first smartcard 23 filesystem, the HSM local storage 305, and/or the second smart card filesystem 30. Implementation code corresponding to the various methods described herein is contained in HSM firmware on the HSM 21.

For example, updates to the first smartcard 23 filesystem are initiated by the HSM 21 and carried out remotely, i.e. over the network connection. Network connections may fail midway through an update procedure, or either the client or HSM end of the connection could be removed or switched off mid-way. Such a connection failure can result in a corrupt smartcard filesystem, which may thus prevent the retrieval or readability of the information stored within.

We describe herein a filesystem structure in persistent storage media, such as in physical authentication tokens or HSM storage. The filesystem is particularly suitable for the storage and retrieval of data such as cryptographic keys, where the filesystem may be implemented on physical tokens such as smartcards, or small secure storage areas on HSMs (Hardware Security Modules). The filesystem is also suitable for media having a storage capacity in the range of hundreds of bytes to around 64 KB.

Nevertheless, it will be immediately apparent to the person skilled in the art that the filesystem and methods disclosed herein are suitable for use on any device having persistent storage media, and having any size storage capacity. Thus, the size or intended use of the storage device puts no constraint on the ability to use the filesystem or methods disclosed herein.

The methods described herein are designed to mitigate potential issues involved in the updating of such filesystems (for example, smartcard filesystems). The filesystem structure and methods of updating said filesystem structure mitigate against issues when updates carried out remotely (for example, over a network connection) are interrupted, for example if the network were to lose connection, or alternatively if the connection were removed or switched off at an HSM. Interruptions may also occur during updates to local smart cards or HSM storage. For example, we disclose herein how to mitigate against issues such as removing a smartcard from the reader during a write, power failure, disconnection of a card reader cable during a write, or software crash in the smartcard or in the HSM during a write operation.

The filesystem structure and corresponding methods disclosed herein may also solve other problems, for example mitigating against the corruption of data in a filesystem during a loss of connection, and maintaining security of sensitive information. For example, corruption is mitigated by ensuring that an intermediate state of a file transaction cannot be read and is subsequently rolled forward or backward by a repair operation. Security of data may be maintained, in some embodiments, by updating a flag in a filesystem header to deliberately indicate a corrupted or unformatted filesystem.

The methods disclosed herein provide improved availability, whilst reducing file and filesystem storage size overheads so that storage devices having small capacities (e.g., less than 64 KB) may be supported. Improved availability is achieved via improved transaction-safety for changes involving single files or groups of files. Transaction-safety for a group of files provides an ability to atomically update a group of files, and have the update roll forward or roll back the whole group in the event of failure. Transaction-safety for an update to a single existing file is also relevant, to avoid an intermediate state that was a partial update, or two copies of the file, etc. Again, transaction-safety allows the update to roll forward or back in the event of failure.

The disclosed methods support changes across multiple files as a single atomic transaction when there is enough free space. The user may optionally configure the implementation such that the transaction method automatically falls down to lower consistency level when there is insufficient storage space for a higher consistency. At the lower consistency level, file header updates are still performed by storing a redundant copy of the file length, mitigating against corrupt files and a corrupt filesystem. Furthermore, the headers for new entries are not visible until the header has been fully written, i.e. the header is written into free space, and then the free space entry is resized safely via the redundant length to make that new entry visible as an atomic operation. In this way, any file header updates are written so that interruption when writing any given byte cannot result in a malformed filesystem or one where the wrong content appears to be present in a file.

Furthermore, files are not committed until all of their content (or replacement content if updating a file) has been written. At the lower consistency level, the consistency will be at the file level rather than across a group of files, where any individual files will not be committed until all content/replacement content is written. Furthermore, at the lower consistency level, files not included in a transaction instruction cannot be lost in an event of failure. This is because file header updates are done in a manner that means the filesystem can still be navigated if a change was interrupted, i.e. a redundant copy of the file length is stored. Furthermore, files not included in a transaction instruction will not be marked as uncommitted at any point. The only changes to files not included in a transaction instruction will be to move them if compacting the filesystem, in which case the transaction-safe compacting algorithm ensures that there is no loss of data in the event of interruption as all file contents are recoverable even if they are in two fragments during the move.

Improved availability may also be achieved via improved fail-safety against corruption or loss of files or the filesystem in the face of interrupted writes to the underlying storage. Fail-safety provides that any individual byte write can fail, but the filesystem can be recovered. Fail-safety improvements are provided with any writes to both smartcards and HSM storage. For example, improved fail-safety is provided during filesystem compaction, header updates, or filesystem formatting.

The methods disclosed herein may also provide reduced risk of remanence (e.g. residual magnetism in a physical hard drive storage) of previous data, by ensuring all erased files and formatted storage are fully zeroised. Furthermore, it should be appreciated that those skilled in the art could similarly apply a scheme to replace zeroization with yet more robust format-safe operation, such as remanence-resistant erasure operations appropriate to the particular physical storage in use.

FIG. 3 is a schematic illustration of a filesystem structure which may be stored on a device in accordance with an embodiment. The diagram shows a 1024-byte filesystem with a header, a first file called /a/1 with content "Example 1", a free-space gap, a second file called /b/2 with content "Example 2", and a free-space block for the remainder of the storage space. Encoding of the text is ASCII and encoding of the 2-byte lengths is little-endian, in this example. However, this is merely illustrative, and actual encodings can be implementation-defined.

Locking for reads and writes may be the responsibility of the user of the filesystem, the filesystem itself is not re-entrant on a particular device. It is assumed that the contents of storage will not change except for any changes that the algorithms themselves make during the period they execute. Multiple reads may actually occur concurrently without interfering with each other, but must be mutually exclusive with any writes. Writes are mutually exclusive with any other writes.

Alternatively, the implementation may specify its own locking structure for reads and writes, e.g. to ensure that parallel write operation do not clobber one another. This can be done as follows:

In general, all reads would acquire a "shared" lock on the specific storage device being operated on (that can operate concurrently with any other "shared" locks but waits if there is an "exclusive" lock currently held). All write operations would acquire an "exclusive" lock that prevents any other reads or writes, and waits until all "shared" and "exclusive" locks are released before continuing. Exclusive lock would generally be held on the storage device by the following interfaces for the entirety of their implementation: Tknfs_Transact; Tknfs_CreateFile; Tknfs_EraseFile; Tknfs_Format; Tkfs_UpdateFile. Shared lock would generally be held on the storage device by the following interfaces for the entirety of their implementation: Tknfs_ListFiles; Tknfs_ReadFile.

Generally, it is assumed that the underpinning storage system writes individual bytes atomically, and the ordering between writes is preserved. Additionally, no assumption is made on the order of writing multiple bytes in a single write operation. If a storage system without this characteristic is used, the fail safety will be reduced.

The general structure of the filesystem and the format of the files used is described in detail below. The following terms will be used in this description:
  STORAGE_SIZE is the total size of storage space used by the filesystem;
  LEN_SIZE is the number of bytes used to specify the size of a filesystem entry (LEN_SIZE is generally 2 bytes (16 bits), which may be used to specify a filesystem entry having a size of up to 65535 bits).
  Where sizeof (TYPE) is used to indicate a size, then it represents the number of bytes used to store the field or header called TYPE.
The filesystem comprises a single filesystem header, referred to here as FS_Header, followed by one or more variably-sized contiguous blocks referred to here as Entry_Block or entries. Entries may be a file, or simply free-space. A file may be in various states reflecting transactions and filesystem compaction operations. These states are defined in detail below.

The format of FS_Header and Entry_Block is defined in the following sections:

Format of FS_Header

For the purpose of this description, the filesystem header (FS_Header) starts at address '0' in the underlying storage medium.

The filesystem header may be prefixed by one or more implementation-defined identifying bytes to distinguish it from other filesystem types. In some examples, the filesystem header may not be at the start of the physical storage address space, in which case, an implementation shall apply the appropriate transformation so that the local filesystem address is translated into the real physical address.

The filesystem header generally comprises the following fields contiguously in the listed order:

TABLE 1a

Structure of general filesystem header

| Name | Size (bytes) | Description |
| --- | --- | --- |
| FS_Type | 1 | Bitmap describing filesystem state and properties. |
| FS_Len2 | LEN_SIZE | Alternate copy of the length of an entry when an entry's Entry_Type has the ETYPE_UNCOMMITTED_LENGTH bit set. |
| FS_FragmentIndex | sizeof (FS_FragmentIndex) | State information for filesystem free-space compaction operations. See FS_FragmentIndex section for definition. |

The FS_Type byte generally has the following structure, consisting of 8 bits:

TABLE 1b

Structure of 'FS_Type' byte of Table 1a

| BIT Offset | 7 | 6 | 5 | 4 | 3 | 2 | 1 | 0 |
| --- | --- | --- | --- | --- | --- | --- | --- | --- |
| Use | Reserved | Bit flags | | Reserved | | | Format Flag | |

The values 0x00 and 0xFF (i.e. the hexadecimal values of 0 and 255, respectively) are deliberately considered never to be valid FS_Type values for a filesystem. This may help to any identify unformatted storage, and may also be utilised for the advantage of security: for example, during a format procedure, the value of FS_Type may be set as 0x00, such that the entry would be deemed corrupted. Once the formatting is complete, the FS_Type is then set to FSTYPE_FORMATTED (0x01) to indicate that the filesystem has a valid format. A malicious attempt to interrupt a format/erase procedure and subsequently read the entry may then be prevented.

The following type codes, and the corresponding bit flags (hexadecimal values in the 'Value' column) which may be used to represent them, are defined below. The bit flags below therefore corresponding to the flags which may be used in 'BIT Offset' 5 and 6 in the table above describing the FS_Type structure.

TABLE 2

Types allowed in filesystem header

| Name | Value | Description |
| --- | --- | --- |
| FSTYPE_FORMATTED | 0x01 | The filesystem is formatted. If this is not set, the filesystem is invalid. |
| FSTYPE_DIRTY (Bit flag) | 0x20 | A transaction is in progress and a repair action is needed. The transaction will be rolled-back unless FSTYPE_COMMITTED is also set. |
| FSTYPE_COMMITTED (Bit flag) | 0x40 | If FSTYPE_DIRTY is also set, the in-progress transaction is committed and should be rolled-forward by the repair action. |

In greater detail, if only the FSTYPE_DIRTY flag is set, if an interruption were to occur during a transaction, the progress of the transaction would be 'rolled-back' to revert to the original state of the file system upon resumption.

If both the FSTYPE_DIRTY and the FSTYPE_COMMITTED flag are set, upon resumption of an interrupted transaction, the progress of the transaction would be continued and the transaction would be completed, i.e., 'rolled-forward'.

It will be understood that the values above are merely for illustration and consistency within the present disclosure, however, other suitable sets of values could be used by a different example implementation.

Format of 'Entry_Block'

In the address space following the Filesystem Header (FS_Header), the filesystem generally comprises one or more Entry_Block filesystem entries (e.g. data files).

Filesystem entries may comprise any of: a single padding byte, a free-space block, a file, and the like.

TABLE 3a

Example structure of a filesystem entry

| Name | Size (bytes) | Applicable Entry_Type types | Description |
| --- | --- | --- | --- |
| Entry_Type | 1 | All types | Describes type and state of entry. |
| Entry_Len | LEN_SIZE, typically 2 bytes in the format of: len_lo | len_hi | All except ETYPE_PADBYTE: This field is absent if Entry_Type is ETYPE_PADBYTE | Total length of the Entry_Block including all header fields. The len_lo and len_hi bytes define the total length of the record (len_lo is the least significant byte, len_hi is the most significant byte; the total length of the Block, including the header is therefore len_lo + 256 * len_hi). |
| Entry_NameLen | 1 (or implementation defined) | All except ETYPE_PADBYTE and ETYPE_FREESPACE | Length of filename. Filenames must be non-empty, so 0 represents a length of 1 and 0xFF a filename of length 256 in order to make use of the full range of possible values for the byte. Add 1 to the Entry_NameLen value to get the actual length of Entry_Name. An implementation could choose to use additional bytes for the filename length to permit longer filenames. |
| Entry_Name | Entry_NameLen | All except ETYPE_PADBYTE and ETYPE_FREESPACE | The filename. The filesystem imposes no restrictions on the values of bytes used in the name, e.g. zero values are permitted. An implementation could choose to impose restrictions on the permitted filenames. |
| Entry_Content | All remaining space in the entry after all other header fields above. | All except ETYPE_PADBYTE | For a free-space block, the content is undefined but will usually be all zeroes. For a file, this is the file content (which may be of zero length). No length limit is imposed on file content except for that implicitly imposed by the remaining available addressable storage space. An implementation may choose to implement additional structure within the Entry_Content in order to implement implementation- |

TABLE 3a-continued

Example structure of a filesystem entry

| Name | Size (bytes) | Applicable Entry_Type types | Description |
|---|---|---|---|
| | | | specific features such as Access Control Lists. |

In respect of the "Entry_Len" name above, it will be understood that the present filesystem is particularly suitable for use in very small-capacity storage areas (for example, less than 64 KB), thus 2 bytes is a generally sufficient length. Nevertheless, it will be generally understood that any suitable number of bytes may be used, i.e., to define a longer entry. Thus, the Entry_Len can be extended to additional bytes if needed, with corresponding updates to Block lengths when stored elsewhere. Merely for example, a third byte len_mid may be used, in which case the total length of the Block including the header length may be calculated as: $len\_lo+(256*len\_mid)+(65536*len\_hi)$.

The Entry_Type byte may be defined as follows:

TABLE 3b

Structure of the Entry_Type byte of table 3a

| BIT Offset | 7 | 6 | 5 | 4 | 3 | 2 | 1 | 0 |
|---|---|---|---|---|---|---|---|---|
| Use | Bit flags | | Reserved | | Type of entry | | | |

Examples of type codes, corresponding to different types of entries, are defined below. The repair actions associated with various type codes are also listed in the table below. The repair actions are performed when performing an access operation on the device, and will be described in more detail in relation to FIG. 7 below. It will be understood that the values (i.e. the bit flags given in hexadecimal) are for illustration and other suitable values could be used by an implementation.

TABLE 4

Types of Entries

| Name | Value | Description | Repair action |
|---|---|---|---|
| ETYPE_PADBYTE | 0x01 | Pad byte. Used to fill gaps between entries and at the end of storage that are too small for a free space block. | — |
| ETYPE_FREESPACE | 0x02 | Free space block. | — |
| ETYPE_FILE | 0x03 | File | — |
| ETYPE_UNCOMMITTED_FILE | 0x04 | Possibly uncommitted new file | If the transaction is not committed, erase this entry. If the transaction is committed, change to ETYPE_FILE type. |
| ETYPE_UNCOMMITTED_ERASE | 0x05 | File that is to be erased | If the transaction is not committed, change to ETYPE_FILE type. If the transaction is committed, erase this entry. |
| ETYPE_UNCOMMITTED_FREESPACE | 0x06 | Free space that may not have been securely zeroed yet, and/or may not have been coalesced with surrounding ETYPE_FREESPACE entries | Zero the contents of the Entry_Block after the Entry_Len field, then coalesce the block with any surrounding ETYPE_FREESPACE entries if applicable and ensure that the Entry_Type is updated to ETYPE_FREESPACE. |
| ETYPE_FRAGMENT | 0x07 | The file data is fragmented into 2 chunks with a gap between them during a compaction operation. | Using state information in the FS_FragmentIndex, continue compaction process. Ultimately this entry becomes a file entry. If more than one ETYPE_FRAGMENT is present, the filesystem is considered corrupt. |
| ETYPE_FRAGMOVED1 (Bit flag) | 0x40 | If the Entry_Type is that of ETYPE_FRAGMENT: this bit flag indicates that the length of data moved so far is stored in FS_FragMoved1, and if the bit flag is not set, the | Using state information in the FS_FragmentIndex, continue compaction process. |

TABLE 4-continued

Types of Entries

| Name | Value | Description | Repair action |
|---|---|---|---|
| ETYPE_UNCOMMITTED_LENGTH (Bit flag) | 0x80 | length of data moved so far is stored in FS_FragMoved0. The length of this entry is stored in FS_Len2 in the FS_Header and the value in Entry_Len should be ignored. The entry should otherwise be considered to be equivalent to an entry without the flag set. | The flag may be set only on ETYPE_FREESPACE, ETYPE_UNCOMMITTED_FREESPACE, or ETYPE_FRAGMENT, otherwise the filesystem is considered corrupt. Copy FS_Len2 into Entry_Len then clear this bit flag, then take any further repair action based on new value. |

A set of interfaces for reading and writing to the filesystem are provided. It will generally be understood that an 'interface' refers to code functions, e.g. stored in HSM firmware code, that implement any of the algorithm described in detail below. These provide the interface for code that needs to read/write files in the filesystem to make use of the below described functionality, i.e. they provide a library of functions for other code to use. Various details can be tailored to the needs of the user of the filesystem. The general aspects of the interfaces for e.g.: formatting the filesystem, implementing filesystem transactions, performing updates to files, enumerating the contents of the filesystem, and reading files are described here.

In an embodiment, the filesystem itself does not implement any access controls on files, and does not perform locking for concurrent access to the same storage device (alternatively, the scheme specified above for "shared" and "exclusive" locks, held on the storage device by the interface implementations, may be used). These are both the responsibility of the user of the filesystem. The algorithms/interfaces are configured to assume that no changes are being made to the storage by any other code or devices whilst they are executing.

Consistent with the example structures of the filesystem entries and filesystem headers described above, we herein describe the following example algorithms, and methods for interfacing with the filesystem, which are used to provide improved fail-safety and transaction-safety for storage media, in particular small-footprint (e.g., around or less than 64 KB) storage media. The methods may be implemented on a device such as has been described above, for example a HSM device 21, in relation to a filesystem stored in local HSM storage 305, a local smart card storage 30 or a remote smartcard storage 29 for example.

Figure 4:
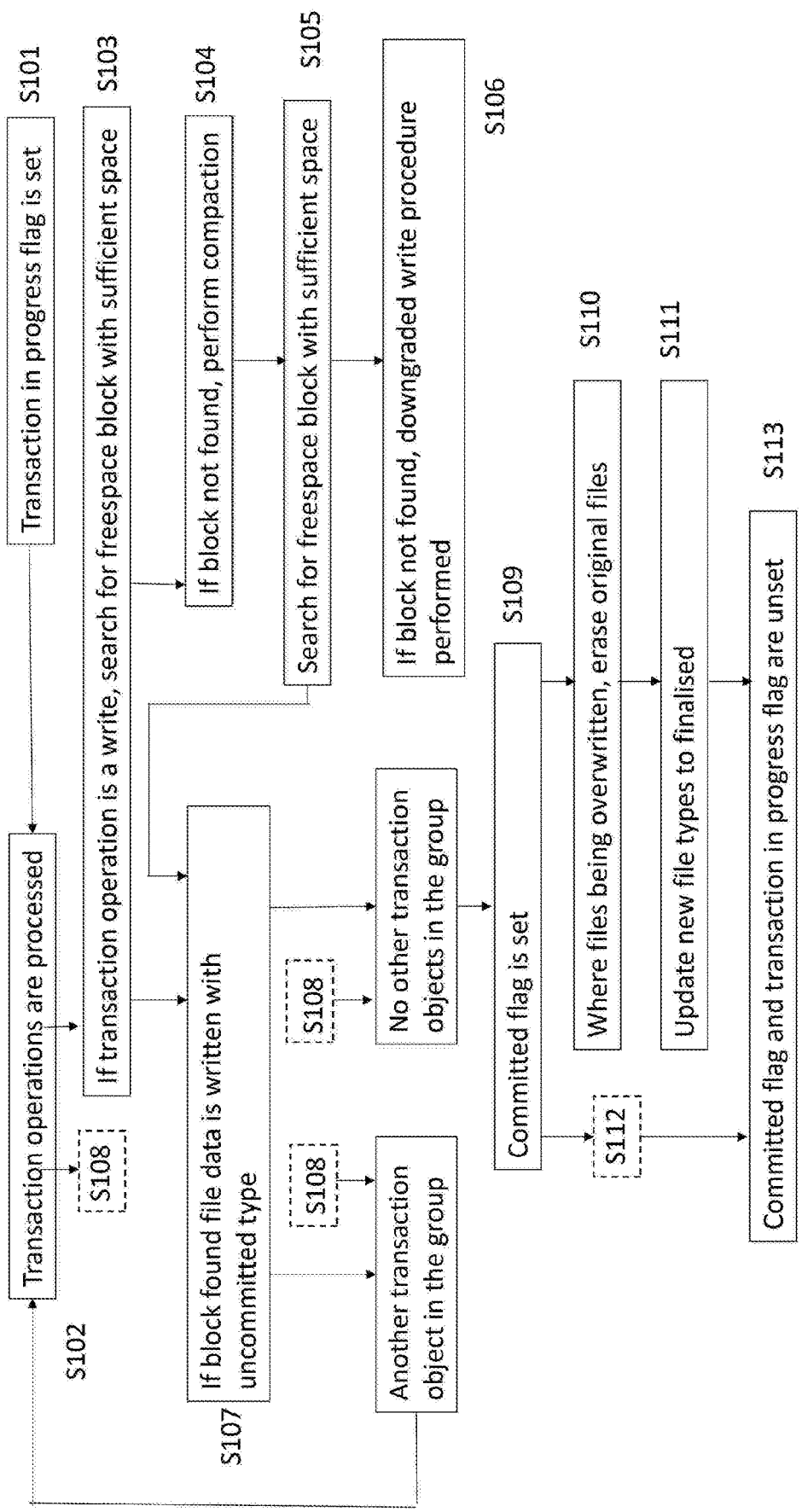
FIG. 4 is a flowchart showing a method of performing a file transaction in accordance with an embodiment, where a transaction instruction comprises one or more write transaction operations.
Figure 5A:
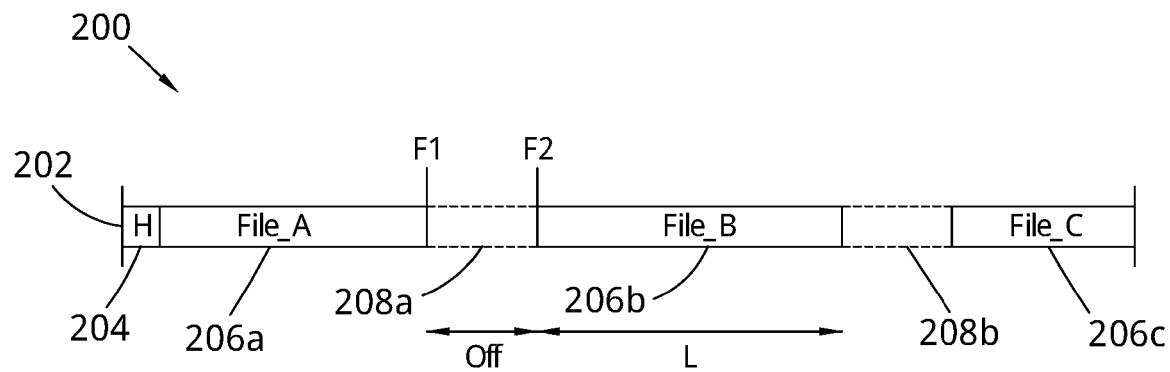
FIGS. 5(a) to (c) illustrate a compaction method applied to the file system as part of a method of performing a file transaction in accordance with an embodiment.
Figure 5B:
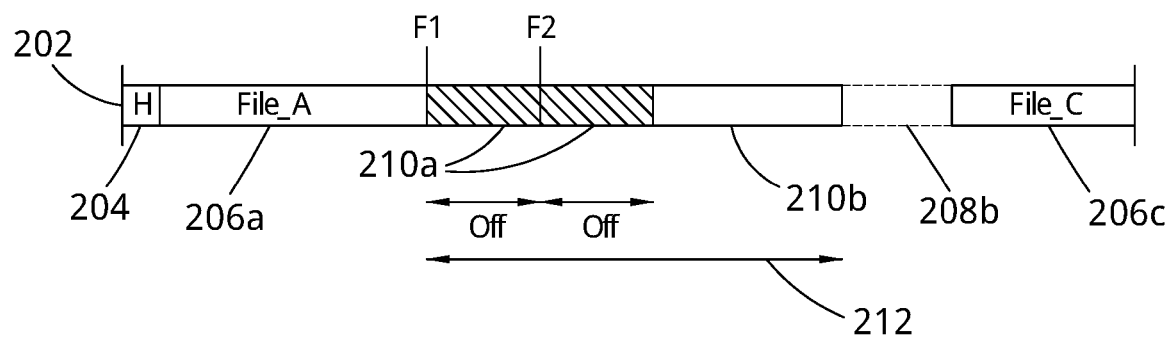
Figure 5C:
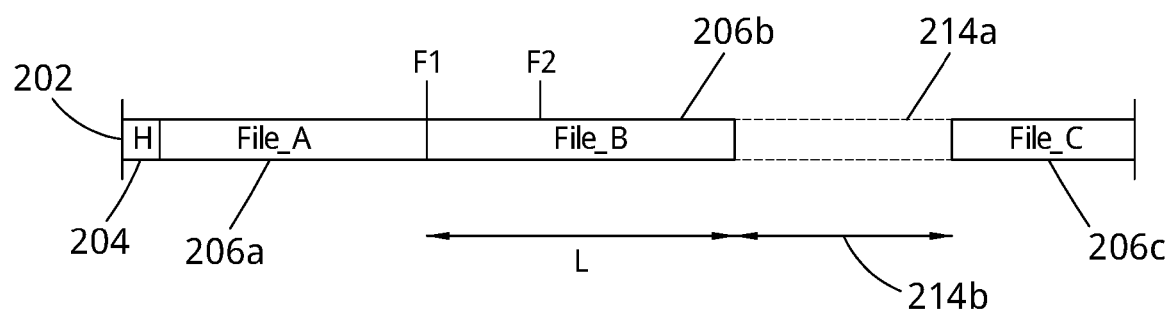
Figure 6:
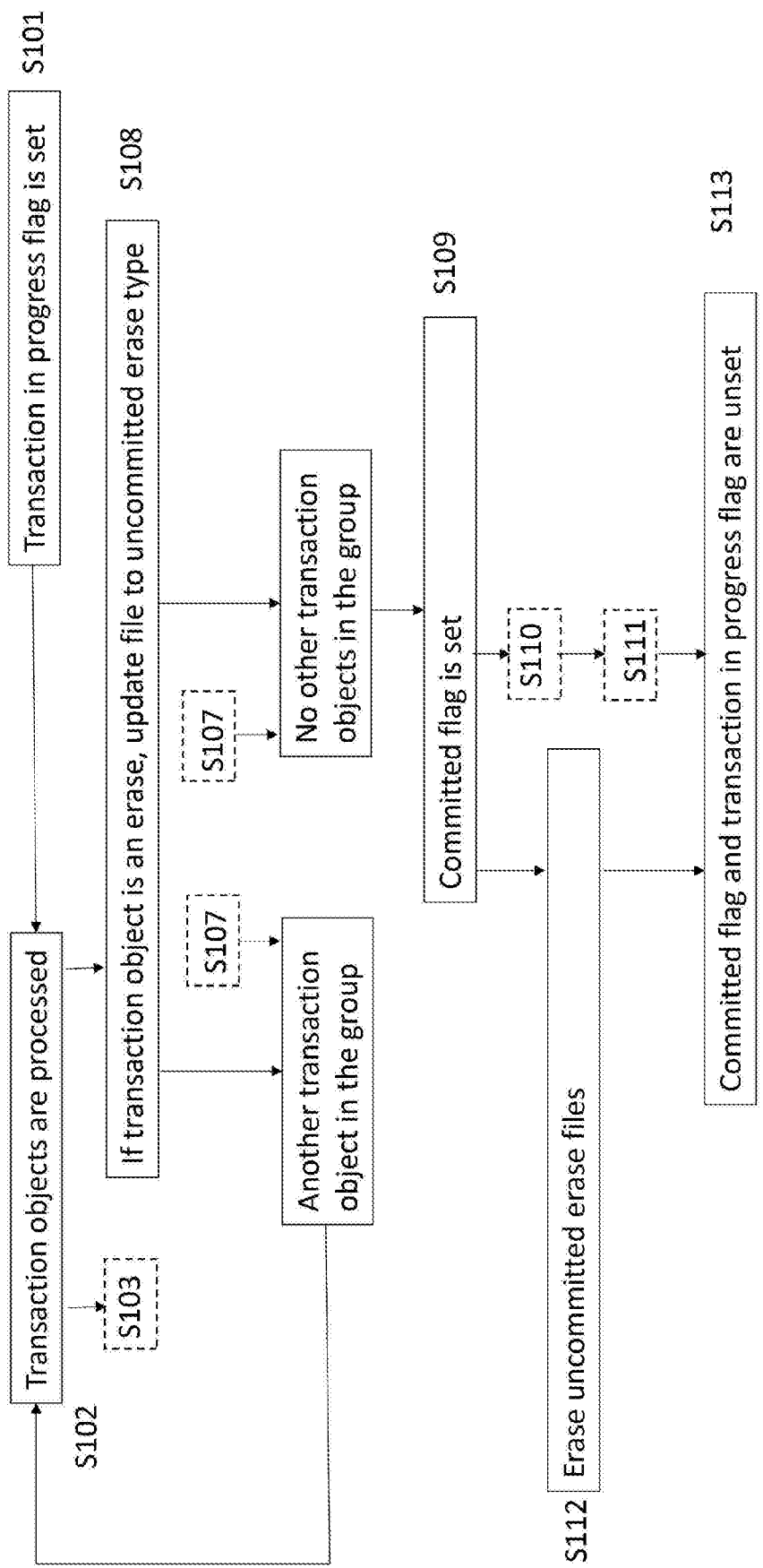
FIG. 6 is a flowchart showing a method of performing a file transaction in accordance with an embodiment, where a transaction instruction comprises one or more erase transaction operations.
Figure 7:
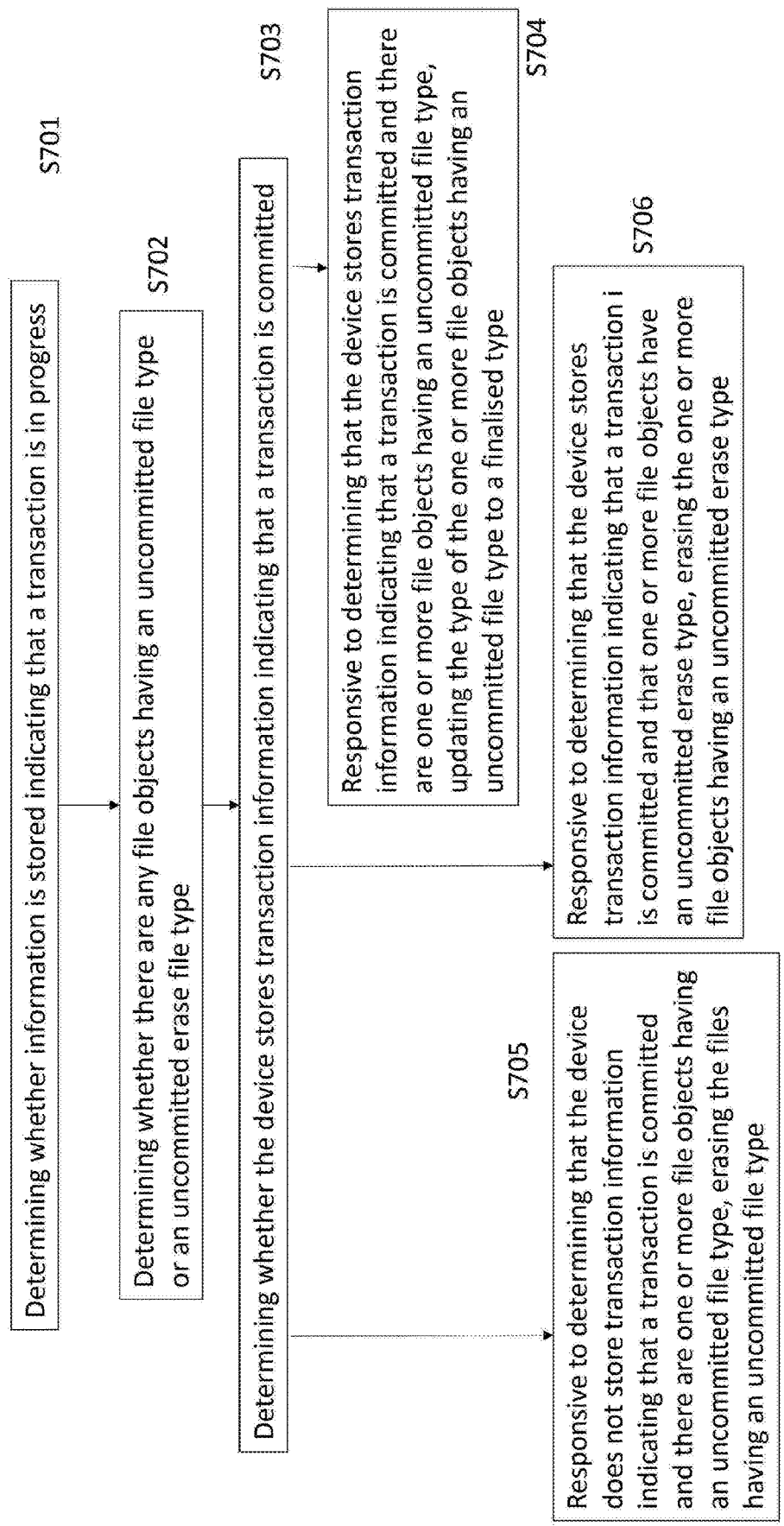
FIG. 7 is a flowchart showing a method of performing a file access operation in accordance with an embodiment.

In particular, FIG. 4 is a flowchart showing a method of performing a file transaction in accordance with an embodiment, where the transaction instruction comprises one or more write transaction operations. FIGS. 5(a) to (c) illustrate a compaction method applied to the file system as part of a method of performing a file transaction in accordance with an embodiment. FIG. 6 is a flowchart showing a method of performing a transaction in accordance with an embodiment, where the transaction instruction comprises one or more erase transaction operations. FIG. 7 is a flowchart showing a method of performing an access operation in accordance with an embodiment.

Enumerating the Filesystem

Before a file transaction is performed, a method of enumerating the file system may be performed as described below. For example, these steps may be performed before the method described in relation to each of FIGS. 4 and 6 are performed.

In order to learn of the contents of the filesystem, a function is provided which 'walks' the filesystem by enumerating filesystem entries. The full address space of the filesystem is read in order to learn the locations, types and/or states of the files/entries within. The results of the enumeration may subsequently be cached in order to allow quick access to the filesystem records without having to repeat the enumeration. For example, where the filesystem of a smartcard is initiated by a Hardware Security Module (HSM) with which it is in communication, the enumeration results may be stored in a cache in the HSM.

The current disclosure refers to the enumeration function as the Tknfs_EnumEntries( ) function, which may then be configured to pass details of every filesystem entry to a user-specified callback function.

Generally, the Tknfs_EnumEntries( ) functions is performed as follows:

1. Set address pointer to sizeof(FS_Header), i.e., pointing to the space immediately after the general filesystem header;
2. If the current address pointer is at, or past, the end of the storage space of the filesystem, stop;
3. The byte at the current address pointer is the Entry_Type value: if it is ETYPE_PADBYTE, skip forward by one byte, and repeat from (2);
4. Otherwise (i.e., if the current byte is not ETYPE_PADBYTE), read header of the current entry (which may be a file or freespace block, depending on the Entry_Type value) at the current address pointer;
5. Check the entry's header for a valid Entry_Type and (unless the entry type is ETYPE_PADBYTE) check the length bytes from Entry_Len (or if ETYPE_UNCOMMITTED_LENGTH flag is set in the Entry_Type, then the length will be read from FS_Len2 in the filesystem header instead). If the Entry_Type value is not a recognized value, or the length points past the end of the storage: report an error and terminate this algorithm.
6. If the entry is a file, Entry_NameLen is read;
7. The following N bytes, where is N is determined by the number of bytes specified in Entry_NameLen, is then read, where said N bytes contain the file name Entry_Name;
8. Pass the storage address pointer of the Entry_Block along with the value of its Entry_Type, and where applicable Entry_Len and Entry_Name, to the callback routine.

9. Increment the address pointer by the length read in (5) (i.e., Entry_Len), and repeat from (2).

The method of enumerating the file system uses embedded file lengths, stored in the file headers, rather than a separate table. This makes the filesystem and enumeration method particularly suited to small footprint devices, since a separate table is not required to be stored.

Transactions on the Filesystem

A change performed on the filesystem is generally referred to as a transaction. A transaction can comprise one or more operations selected from the group of: write, overwrite, and erase for example.

Overwrite is described here as particular type of write transaction operation. Thus when the term "write transaction operation" is used in the following description, it is understood that this may include an overwrite transaction operation. It will nevertheless be understood that an 'overwrite' as described below may comprise a write operation followed by an erasure of the (pre-existing) duplicate file which is to be overwritten. In this way, a copy of either the pre-existing or new file is always present, such that the filesystem can be safely rolled-forward or rolled-backwards to either the intended final state, or the original state of the filesystem. In certain examples (e.g., where sufficient space does not exist to hold redundant copies of file entries), the file to be overwritten may be erased first.

When a transaction is initiated (e.g., by an HSM), a transaction instruction, comprising one or more transaction objects as described below, is provided (by the HSM 21). Each transaction object specifies a transaction operation, and (in the case of a write or overwrite) the corresponding information to be written. The data structure used for the transaction objects is described below. The objects, which collectively form the transaction instruction, are called TKNFS_FILE_CONTENT objects, and are used to store information about a file change. The TKNFS_FILE_CONTENT object relates to a transaction operation to write a file on the device (i.e. when the TKNFS_OPERATION field specifies the type of transaction operation as TKNFS_CREATE or TKNFS_OVERWRITE described below) or a transaction operation to erase a file from the device (i.e. when TKNFS_ERASE is specified).

Alternative structures suitable for describing the object will be readily apparent to the skilled person. However, an example structure of the TKNFS_FILE_CONTENT object is shown below, comprising three sections:

TABLE 5

Structure of transaction object

| Name | Description |
| --- | --- |
| TKNFS_OPERATION | This field specifies the type of transaction operation, chosen from any one of:<br>TKNFS_CREATE: Create a new file named TKNFS_FILENAME<br>TKNFS_OVERWRITE: A pre-existing file with the same file name (TKNFS_FILENAME) is to be overwritten (i.e. replaced)<br>TKNFS_ERASE: A pre-existing file with name TKNFS_FILENAME is to be erased |
| TKNFS_FILENAME | An array of bytes at least 1 byte long (up to the maximum length that can be stored in Entry_NameLen), which specifies the file name to be stored in Entry_Name (if TKNFS_CREATE or TKNFS_OVERWRITE is the specified transaction) or the file name to be erased (if TKNFS_ERASE is the specified transaction). |

TABLE 5-continued

Structure of transaction object

| Name | Description |
| --- | --- |
| TKNFS_DATA | This field is optional. For example, this field will be empty if TKNFS_ERASE is the specified transaction operation of the file object.<br>Generally, this field may comprise an array of 0 or more bytes specifying the file data. |

The TKNFS_FILENAME corresponds to identification information for the file to be written or erased.

A process for performing a sequence of changes applied to the filesystem when performing a set of one or more transactions is performed as follows:
  i. The FSTYPE_DIRTY flag is set in FS_Type to indicate that a transaction is in progress.
  ii. The transaction changes are written as uncommitted.
     (Up to this point, after an interruption to the transaction, a repair action will result in rolling the filesystem back to the original state)
  iii. The FSTYPE_COMMITTED flag is set in FS_Type to indicate the transaction has been committed (i.e. fully written).
     (From this point onwards, after an interruption to the transaction, a repair action will result in rolling the filesystem forward to the intended final state)
  iv. The transaction changes are rolled forward.
  v. The FSTYPE_DIRTY and FSTYPE_COMMITTED flags are unset in FS_Type.

It will be understood that the FSTYPE_DIRTY flag set in i gives no indication as to progress of a write/erase operation; rather, it indicates that the transaction as a whole has begun but is not complete. The inclusion of the FSTYPE_DIRTY flag allows a repair action to avoid performing subsequent checks (for example, whether the transaction is committed) in cases where no file transaction has been interrupted. Thus if the FSTYPE_DIRTY flag is not set when an access operation is commenced, further checks need not be performed. In some alternative embodiments, the feature of the FSTYPE_DIRTY flag is not included.

Use of a committed flag provides a single check as to whether a transaction is committed. Setting the committed flag corresponds to storing transaction information on the device indicating that a transaction is committed. Alternatively, this could be represented by updating individual files to committed types for example.

After step ii, and before step iii, since the FSTYPE_DIRTY flag is in the general filesystem header but the FSTYPE_COMMITTED flag is not set, the transaction will not yet be considered committed. Therefore, any recovery of the filesystem in this state will roll-back the transaction.

Following step iii, any recovery of the filesystem in this state will roll-forward the transaction, indicated by the FSTYPE_COMMITTED type in the general filesystem header. Advantageously, in step v, the two flags are unset atomically, i.e., as a single 1-byte write operation.

No writes are made to the filesystem until all the changes for the transaction are known. This may be achieved by an API for the filesystem implementation taking the full set of files to write or update. More generally, a BEGIN/COMMIT transaction wrapper may be included around a sequence of file transaction, where all of the tracking of the changes is done in main memory and only when the transaction is COMMITed do the writes happen to the filesystem, at which point all the files to update would already be known.

The specific interfaces available to interact with the contents of the filesystem are detailed below:

Tknfs_Transact:

This interface creates, overwrites and/or erases one or more files as a single transaction. A single transaction instruction can include transaction operations having each of a write, overwrite, and erase function, and therefore all three types of operations can be done simultaneously with transaction safety. Each of the write, overwrite, and erase operations will either roll-forward (to the intended final state) or roll-backward (to the initial filesystem state) during a repair action, following an interruption to the file transaction.

An array of TKNFS_FILE_CONTENT (as described above in Table 5) objects are passed to specify the parameters for each file. This array corresponds to a transaction instruction. Each object specifies the file name and flags to indicate any one of:

a new file (TKNFS_CREATE); or a file that may overwrite an existing one with the same file name (TKNFS_OVERWRITE); or that a file with that file name should be erased (TKNFS_ERASE).

The file contents comprised in TKNFS_DATA (see Table 5 above) for new or overwrite files are generally provided as an opaque byte-block. The specific user implementation, i.e. which may be further defined by the user of the filesystem, may optionally implement an additional structure within said opaque byteblock for new/overwrite files.

A method of performing a file transaction on a device will now be described in relation to FIG. 4. FIG. 4 is a flowchart showing a method of performing a file transaction on a device in accordance with an embodiment.

A transaction instruction to perform a set of one or more transaction operations on the device is provided by the HSM. The transaction instruction may be generated at the HSM device 21 in response to a command received by a user. The transaction instruction comprises one or more transaction objects as described in Table 5 above, each specifying a transaction operation to be performed. These operations correspond to those specified in the user command. Various interfaces may be provided to generate the transaction objects corresponding to the requests in a received user command, as will be apparent to the skilled person.

In S101, before making any other changes to the storage, FS_Type is updated to set the FSTYPE_DIRTY flag to indicate that a transaction is in progress.

Optionally, all file parameters are validated up-front before making any changes to the file system. This validation may include checking that there is enough space for all content. In other words, this comprises determining whether a size of all files to be written exceeds an available storage on the device. This step may further comprise checking that an attempt is not being made to replace an existing file unless the TKFNS_OVERWRITE flag is set.

A first transaction operation specified by a first transaction object in the transaction instruction is processed in S102. The steps performed responsive to determining that the transaction operation is a write in S102 are shown in full FIG. 4. Other steps of the method which are more relevant to 'erase' transaction operations (some of which are indicated by dashed boxed in FIG. 4) are shown in full separately in FIG. 6 for clarity. Write transaction operation objects have the structure shown in Table 5 above, where TKNFS_CREATE or TKNFS_OVERWRITE is specified.

Each write transaction operation object in the transaction instruction corresponds to a file object. The 'write' transaction operation objects in the transaction instruction collectively relate to a first file group comprising at least one file object. The first file group comprises all the file objects to be written to the device, wherein the file objects in the first file group collectively have a first size, and wherein each of the file objects comprises identification information, namely the filenames.

In S103, the filesystem is searched for a free space block with sufficient space to write the file object corresponding to the write transaction operation. To write (and overwrite) a file, Tknfs_EnumEntries( ) is first called looking for a suitable record containing free space. In some examples, the full 'walk' of the filesystem may not be necessary; i.e., results of a previous filesystem enumeration may be stored in a cache for quick access. A best-fit algorithm is performed, in which the whole device storage space is searched.

A freespace block with the least excess space is picked; preferably, a freespace block is chosen having a size that does not require (unusable) padding bytes to be written.

Optionally, any new file is written (i.e. any file in the group of file objects which has a TKNFS_CREATE or TKNFS_OVERWRITE flag) to a gap between two existing files only if the file size matches the gap size exactly, or if the remainder (between file size matches and gap size) is at least large enough for a free-space entry. In this way, padding bytes can be avoided. Only if there is no other available space, padding bytes may be written. This has the advantage of ensuring that unusable and non-compactable padding bytes are unlikely to be generated. Writing new files in this manner makes it less likely that unusably small spaces that can't be safely compacted will arise.

If no such freespace block exists, the entire device is compacted in S104 (the compaction algorithm is described below in detail in relation to FIG. 5). In summary, compaction involves (starting at the beginning of the storage area) moving files 'backwards' (i.e., to earlier address space) so that all gaps between existing entries are removed. Gaps between file entries may comprise free space or padding bytes, for example. After the existing entries have been moved, a new freespace record is created, which contains all the available storage in a single block. For example, if all existing files are moved backwards to the 'front' of the storage space, the single freespace block will be created at the 'end' of the storage space. Compaction of the filesystem occurs if a suitably sized gap between two existing files cannot be found. Compaction is generally preferable to writing a new file in a gap that is larger than a size of the new file (but where said gap is too small for both the new file and a free-space entry), as this avoids writing padding bytes.

After completion of compaction, the search (i.e. the enumeration) for a suitable record containing free space is repeated in S105. Repetition of the compaction/enumeration ensures that file creation will always succeed if it is physically possible—i.e., if there is physically sufficient free space available.

Following compaction, if there is still not enough space, then a downgraded procedure may be followed in S106. This is explained in more detail further below. This may comprise existing file entries to be overwritten being erased before the new file is written. This results in a downgrade of the transaction-safety behaviour. Following the erasure of the file to be overwritten, a search for free space is repeated, compacting again if necessary.

When the allocation has succeeded, the file data specified in the TKNFS_FILE_CONTENT file object is written, and the header at the start of the free space record is rewritten to reflect the new file in S107. The Entry_Type byte of the new file is written as ETYPE_UNCOMMITTED_FILE. If the allocated free space block is longer than required, a new free space record is created at the end of the new file. Optionally, if there isn't enough space for a free space record, a block of pad bytes is written instead.

In S107, the new file objects are created with an ETYPE_UNCOMMITTED_FILE Entry_Type. If the TKNFS_OVERWRITE flag is set in the file object, the name of the file object will be shared with a name of an original/pre-existing file in the filesystem. Original files of the same name are left unmodified at this stage.

In response to all new file entries having been written, and all the Entry_Type of files to be erased having been updated to ETYPE_UNCOMMITTED_ERASE (as will be described in relation to the procedure for any erase transactions shown in FIG. 6 below), the transaction is flagged as committed by setting the FS_Type to the FSTYPE_COMMITTED flag in S109. This is an example of information indicating that a transaction is committed. If further transaction operations are to be processed, the method returns to S102, and the next transaction object is processed.

Where files are being overwritten, the original files with the same filename are then erased as per the safe erasure algorithm (which will be described in detail further below) in S110.

In step S111, following the FSTYPE_COMMITTED flag being set in the general filesystem header, the Entry_Type on the newly written files is changed from ETYPE_UNCOMMITTED_FILE to ETYPE_FILE. This is also referred to as a finalised type.

Finally, in S113, the FS_Type in the general filesystem header is updated to clear both the FSTYPE_COMMITTED and FSTYPE_DIRTY flags.

In this manner, changes to a filesystem are made in such a way that, wherever possible, the file system will be recoverable to either the original state, or to the intended state, if any I/O (e.g., a network connection) fails.

Recovery (described below in detail in relation to FIG. 7) of a filesystem occurs automatically when any read or write is attempted on the filesystem. If a write transaction operation was previously interrupted, when the filesystem is read again it will either be rolled-back to the original state with none of the new files, and the original version of files being overwritten, or rolled-forward to the new state with all the new or changed files. The exception to this is in the event that there was not enough space to make the changes in a fully transaction-safe manner, and the downgraded procedure in S106 was used, in which case a subset of new files may be present and files to be overwritten may have either old or new content or be absent.

The group of files is written (or overwritten) as a single, atomic, transaction. An atomic transaction guarantees that updates do not occur only partially, and thus guarantees that a file transaction as defined by a transaction instruction is either carried through to completion, or does not occur at all. In practice, in the event of an interruption to a transaction, the recovery/repair system rolls the filesystem either forward or backwards, to an initial state or an intended final state.

The method of performing a file transaction on a device will now be further described in relation to FIG. 6. FIG. 6 is a flowchart showing a method of performing a file transaction on a device in accordance with an embodiment. The steps performed responsive to determining that the transaction operation is an erase transaction operation in S102 are shown in FIG. 6.

Steps S101 and S102 shown in FIG. 4 are also shown in FIG. 6 for clarity. The steps performed responsive to determining that the transaction is an erase are then shown in FIG. 6. Thus if a transaction is an erase, step S108 is performed instead of S103. Erase transaction have the structure shown in Table 5 above, where TKNFS_ERASE is specified. An erase transaction corresponds to a file object. The erase transaction operation objects in the transaction instruction collectively relate to a second file group, comprising at least one file object. The second file group comprises all the file objects to be erased from the device, wherein each of the file objects comprises identification information, namely the filenames.

In S108, the file due to be erased has its type updated to the ETYPE_UNCOMMITTED_ERASE Entry_Type. This is a second uncommitted type, that is used for files to be erased.

As has been described previously, in response to all new file entries having been written, and all the Entry_Type of files to be erased having been updated to ETYPE_UNCOMMITTED_ERASE, the transaction instruction is flagged as committed by setting the FS_Type to the FSTYPE_COMMITTED flag in S109 shown in FIG. 4. This step is also shown in FIG. 6.

Following the FSTYPE_COMMITTED flag being set, each of the ETYPE_UNCOMMITTED_ERASE files are erased in turn as per the safe erasure algorithm (described below) in S112.

Finally, the FS_Type in the general filesystem header is updated to clear both the FSTYPE_COMMITTED and FSTYPE_DIRTY flags as has been described previously in S113.

Although for simplicity, the method has been shown with the steps for the write transactions in full in FIG. 4 and the erase transactions in full in FIG. 6, it will be clear to the skilled person how the method is performed in the case where the transaction instruction comprises both erase and write transaction operation objects. In particular, it is clear from the above description that the committed flag is not set until all new file entries have been written as uncommitted and the entry type of all files to be erased is set to uncommitted erase. Furthermore, it is clear that the committed flag and the transaction in progress flags are not cleared until all new files are updated to finalised and all uncommitted erase files are erased.

Any file being erased is generally first overwritten with zeroes before being converted into free space. The space freed by this operation is co-coalesced with any free space preceding or following the file being erased. The callback to Tknfs_EnumEntries( ) records the first free space record found before the given file, and the first non-free-space record found after it. All storage between these two addresses is converted into one free space record, so that neighboring blocks of free space are aggregated.

If the file transaction is interrupted, when the filesystem is read again it will either be rolled-back to the original state with the files present or rolled-forward to the intended state with the files removed. This will be described in relation to FIG. 7 below.

Optionally, whenever an Entry_Block is "erased", the following steps are taken to ensure that all previous data is removed safely, without leaving portions of the original data present on the storage:
  i. The Entry_Type of the Entry_Block is set to ETYPE_UNCOMMITTED_FREESPACE (this informs the filesystem recovery code that the original data may not yet have been fully overwritten with zeroes);

ii. All storage in the Entry_Block after the Entry_Len field is overwritten with zeroes;
iii. If the Entry_Block is not preceded, or followed by, a ETYPE_FREESPACE entry:
Entry_Type Of the Entry_Block is updated to ETYPE_FREESPACE;
else, if the Entry_Block is preceded, but not followed by, an ETYPE_FREESPACE entry:
the preceding ETYPE_FREESPACE entry is resized using the safe header update algorithm (see "Updating entry Headers" algorithm below) to encompass both the entry being erased and the one preceding it;
else, if the Entry_Block is only followed (i.e., not preceded) by a ETYPE_FREESPACE entry:
the Entry_Block being erased is resized using the safe header update algorithm to encompass both the entry being erased and the one following it, and the type of the Entry_Block then changed to ETYPE_FREESPACE;
else, if the Entry_Block is preceded and also followed by a ETYPE_FREESPACE entry:
the preceding ETYPE_FREESPACE entry is resized using the safe header update algorithm to encompass all three blocks.

The ETYPE_UNCOMMITTED_FREESPACE is a means to ensure that free space that was previously being used to store a file gets zeroised during filesystem recovery, if it wasn't zeroised due to a change being interrupted. For example, if a file is logically erased but the original storage wasn't zeroised so that data could still be recovered. This will be taken care of during recovery when the filesystem is next loaded, so that there is no leakage of data after it is erased.

It will be understood that the erasure operation can apply to any of: erasing a ETYPE_FILE as part of a Tknfs_Transact transaction; erasure of any other Entry_Block, e.g., erasure of the existing copy of a file being overwritten when committing a transaction; and erasure of a ETYPE_UNCOMMITTED_FILE when rolling back an uncommitted transaction during a repair operation. This procedure may therefore be performed in S112 and S111 of the above described method.

An example of a downgraded write procedure with lower transaction safety which may be performed in S106 of FIG. 4 will now be described below. In some cases, there may be insufficient space on a token device to make transaction changes in a fully transaction-safe manner. Therefore, a downgraded level of safety may be applied by the implementation. In such examples, the integrity of the filesystem is still preserved such that files that should have been unaffected by the change will always be retained without any corruption.

In the event that there is insufficient space for writing the next file in the group of file objects, then the transaction algorithm is modified to downgrade the transaction-safety to two lower levels in S106, according to the following procedure:
i. An attempt is made to make more storage available by 'committing' the current status of the transaction:
a. set the FSTYPE_COMMITTED flag in FS_Type in the general filesystem header;
b. delete any original (i.e., pre-existing) file entries with duplicate filename identification (if overwriting) to any ETYPE_UNCOMITTED_FILE entries;
c. promote any ETYPE_UNCOMMITTED_FILE entries to ETYPE_FILE, and update ETYPE_UNCOMMITTED_ERASE files to erase them completely (where the erasure is preferably performed according to the safe erasure algorithm).

The effective transaction-safety is therefore downgraded to per-file rather than per-group-of-files after the point in the transaction that there was insufficient space to write the next file. In this scenario, atomicity of the transaction as a whole may be lost.
ii. The following steps are optionally performed, if the steps in i did not reclaim sufficient available storage (including optionally compacting the filesystem according to the compaction algorithm):
a. the next file in the group of file objects to be written overwrites the original (i.e., pre-existing) file having the same identification, comprising erasing the original file as per the safe erasure algorithm;
b. the new file to be written is written.
Transaction-safety is in ii then lost for that file, although the integrity of other files will be retained.
iii. After either of the intermediate downgraded-safety transactions in i or ii are completed, and before continuing with further writes, the FSTYPE_COMMITTED flag is unset in the general filesystem header.

In both the downgraded transaction-safety levels in i and ii above, the implementation may still calculate up-front whether there is enough space to complete the transaction before making any changes to the storage. If there is still not sufficient available storage, the whole transaction is deemed to have failed.

Tknfs CreateFile

This interface is a special case of Tknfs_Transact( ) for writing or overwriting a single file. The function behaves as though Tknfs_Transact( ) were called with a single TKNFS_FILE_CONTENT object which has either the TKNFS_CREATE or TKNFS_OVERWRITE flag set.

Tknfs EraseFile

This interface is a special case of Tknfs_Transact( ) for erasing a single file. It behaves as though Tknfs_Transact were called with a single TKNFS_FILE_CONTENT file object containing the file name and the TKNFS_ERASE flag.

Various additional methods that may be performed on the filesystem will now be described.

Tknfs Format

This interface firstly passes on any device-specific 'low-level format' request to initialize the device, zeroes the storage, then writes the filesystem header and the start of the storage space followed by a single free-space record spanning the remaining storage space. Performing a formatting operation ensures all existing data is zeroized, not just headers updated.

The flag "FSTYPE_FORMATTED" is set to zero at the beginning of the format procedure. If the format operation is interrupted before completion, when the filesystem is read again it will not be considered a correctly formatted filesystem and so will have to be re-formatted. This allows that a malicious user attempting to interrupt a format will not be able to access the content of the filesystem.

The Tknfs_Format function is performed in the following manner:
i. The FS_Type is set to zero to indicate that the filesystem is not formatted correctly (additionally, this indicates an invalid system, such that the filesystem cannot be read during a format operation).
ii. The entire storage space of the filesystem is zeroed (the choice of zero is arbitrary; alternatively the filesystem could be filled with ones).

iii. A ETYPE_FREESPACE entry is created at address sizeof (FS_Header) that spans the entire remaining address space, i.e. the Entry_Len will be STORAGE_SIZE—sizeof (FS_Header).
iv. The FS_Type is set to FSTYPE_FORMATTED to indicate that the filesystem has a valid format.

If the format is interrupted, the filesystem is unreadable. An interrupted format is thus detectable, and the filesystem considered to be unformatted. The storage would have to be formatted again in a manual step before it was readable.

Alternatively, unformatted storage may be formatted automatically when a read/write is first attempted on it as part of the recovery process. As a further alternate, an explicit format operation might be required first as part of a recovery operation for unformatted storage. The purpose of this is to ensure that even if the format is interrupted, all old data will be fully erased and not merely "invisible" due to the filesystem header being updated.

The format operation essentially creates a block that is the full length of the filesystem. If there were a valid filesystem there before, the format operation would change it to zeroised free space as a single transaction.

Tknfs ListFiles

This interface lists all files on the device by name. This can be implemented using Tknfs_EnumEntries( ) as described previously.

Tknfs ReadFile

This interface reads the file content of a file with a user-specified file name or returns an error if the file does not exist. This can be implemented using Tknfs_EnumEntries( ) to search for the file entry with the specified name, followed by reading the Entry_content from storage at its offset from the Entry_Block address pointer.

Tknfs UpdateFile

This function selectively updates part of an existing file entry from a supplied buffer; the file name is given (together with flags), together with a byte offset and length within the file. The byte offset describes the point in the file at which the selective update begins, and the length describes the size of the portion within the file to be updated. If the call is interrupted, when the filesystem is read again it will either be rolled-back to the original state of the file or rolled-forward to the new intended state of the file. Alternatively, in the event that there is insufficient space on the device storage to perform a transaction-safe operation, the file may be absent. The absent file may result from an attempt to update a file during a lower level of consistency; for example, if the implementation dropped down to a lower transaction consistency level and was forced to delete an original file before writing the new (updated) file because there wasn't enough space for both copies.

The Tknfs_UpdateFile function is performed in the following manner:

The implementation holds a lock on the storage for the duration of both the read and write operations. This means that that an update is done atomically, such that it will read the current file and write the updated file as an overwrite operation, where intervening writes by any other code or devices are not permitted (if intervening writes were permitted, some other thread of execution could modify the file being updated, in which case a portion of the file other than the one intended to be updated may be modified). This update interface is described below:
i. The existing file is read into main memory (the RAM of the HSM), e.g. with Tknfs_ReadFile;
ii. The update operation is virtually applied in the main memory, so that the entirety of the new file is stored in main memory (i.e., to allow roll-forward in the case of interruption);
iii. The change is implemented as though Tknfs_CreateFile( ) with the TKNFS_OVERWRITE flag were called.

Because the supplied buffer (as created in step ii) is created externally from the filesystem and contains the entire updated version of the file, at any point, there exists at least a copy of either the original, or the updated file (or both). Therefore, transaction safety is guaranteed because one of a roll-back or roll-forward will always be possible.

Updating Entry Headers

The header of individual entries may be modified in various different scenarios. The following are merely particular examples of updating a header, where the order of update operations is chosen such that the update as a whole is atomic.

A header is updated when an existing Entry_Block is being split into two blocks. For example, this occurs when splitting an ETYPE_FREESPACE entry into a new file entry and a smaller ETYPE_FREESPACE block. Thus a header update occurs in S107 of the above described method for example. The header is updated as an initial step, before the file contents are written.

In this example, the new Entry_Block header at the higher address shall be written first so that it is "invisible" when navigating the filesystem, and will only be visible when the existing Entry_Block is resized (i.e., decreased in size).

In general, whenever a "visible" file header is modified (i.e., one that is currently needed to navigate the filesystem, not one being written inside an existing Entry_Block), it must be ensured that no intermediate state would be unrepairable. The Entry_Len is typically at least two bytes long, and so cannot be reliably updated atomically at the I/O level. This is because only one byte of the length may have been written, and no assumptions are made about simultaneous byte writes. The following procedure is therefore followed:
i. Safe updating of the length (Entry_Len) of an Entry_Block is achieved by having the new length initially stored in FS_Len2 in the filesystem header, before the Entry_Len value is updated;
ii. the Entry_Type bit flag ETYPE_UNCOMMITTED_LENGTH is subsequently set, which indicates that the implementation should look in FS_Len2 for the length, rather than in Entry_Len;
iii. the Entry_Len location is updated with the new length. If this fails before all bytes of the length are written, the correct length can still be read from the FS_Len2 location;
iv. the Entry_Type is updated again to no longer have the ETYPE_UNCOMMITTED_LENGTH flag set.

Setting the 'uncommitted' length flag in step ii is atomic, because the Entry_Type is a single byte and as such can be reliably updated in a single write operation (according to the pre-requisites for the filesystem).

In practice, only ETYPE_UNCOMMITTED_FREESPACE, ETYPE_FREESPACE and ETYPE_FRAGMENT entries need ever be resized. Recovery code may thus optionally enforce that the ETYPE_UNCOMMITTED_LENGTH flag can only be set on the above three entries, and to report an error otherwise.

If the transaction is interrupted, if the ETYPE_UNCOMMITTED_LENGTH flag is present in the Entry_Type of any entry, the Entry_Len is updated with the length read from FS_Len2, and the ETYPE_UNCOMMITTED_LENGTH flag is subsequently unset. This allows the file header update to be rolled forward.

Compaction Algorithm

As has been described above, for example in relation to S104, a compaction process may be performed on the file system. An example compaction process will now be described.

The FS_FragmentIndex in the filesystem header, described above in Table 1 a, is used during the compaction process. This stores extra tracking information about the contents of an Entry_Block having the type ETYPE_FRAGMENT, when the filesystem is being compacted. The FS_FragmentIndex is stored in the general filesystem header, to guarantee that there is always space in the device to store the fragment information. This ensures that there is always sufficient space for a compaction procedure to take place. An example structure of the FragmentIndex is shown below in Table 6.

TABLE 6

Structure of the FS_FragmentIndex

| Name | Size (bytes) | Description |
| --- | --- | --- |
| FS_FragCode | sizeof (Entry_Type) | Backup of Entry_Type of a file during a compaction operation. |
| FS_FragOffset | LEN_SIZE | Offset within the fragment being compacted. |
| FS_FragMoved0 | LEN_SIZE | Number of bytes moved within the fragment. |
| FS_FragMoved1 | LEN_SIZE | Alternate copy of number of bytes moved within the fragment. |

When creating or updating files, code may compact the filesystem (moving files to lower addresses to remove free space gaps between them) if there is not enough space to write the new file as a single contiguous chunk. Fail-safety for the compaction algorithm is achieved in the following manner:

FIGS. 5(a) to 5(c) illustrate a series of examples states of a filesystem 200 during a Compaction process, according to the algorithm below.

FIG. 5(a) illustrates an initial state of an example filesystem 200. The integers of the filesystem 200 are as follows: beginning/start of the address space of the filesystem 202, general filesystem header 204, a first file 206a named File A, a first block of freespace 208a, a second file 206b named File B, a second block of freespace 208b, and a third file 206c named File C. The length/size of the first block of freespace 208a is denoted by 'Off'. Each of the blocks (files and freespace) contain a header which contains information about the length of the block. The length/size of the second file, which is the file being moved in the compaction process, is denoted by I'.

F1 denotes the address where the file data (i.e. File B) is being moved to, and F2 denotes the address where the file data is being moved from. Thus, the identity F2=F1+Off holds, where Off is the original start of the file data relative to the new start of the file data.

FIG. 5(b) illustrates the state of the filesystem 200 midway through a compaction. M denotes the length of the file being moved (File B) which has so far been transferred to the new location. Chunk 210a represent the portion of File B which has so far been moved to location F1, and Chunk 210b represents the remainder of File B which has not yet been moved. During compaction, the header of the first freespace block 208a (at F1) is altered such that the total length 212 stored refers to the entire space spanning from F1, to the end of the original File B (corresponding to the header in the second freespace block 208b). Additionally, the type of the intermediate block 212 is changed to 'ETYPE_FRAGMENT' in the header at F1.

The intermediate state of compaction is tracked in the FS_FragmentIndex in the filesystem header, which is initialized to all zeroes before moving each file. The Entry_Type of the file being moved is stored in FS_FragCode, the offset (Off) of the original start of the file data relative to the new start of the file data is stored in FS_FragOffset. The length of data which has been successfully moved so far (M) is stored alternately in FS_FragMoved0 and FS_FragMoved1, depending on whether the ETYPE_FRAGMOVED1 flag is set. The alternation of locations to store the length enables it to be updated atomically.

Following step 3(i) below, at most MIN(Off, L-M) bytes of File B are written in one go. In the example shown in the figures, in the first step this length corresponds to Off, the length of chunk 210a, because in the example of FIG. 5, the file length of B (L) is greater than the size of the freespace block 208a into which it is being moved.

In the event of interruption, the file data can be recovered by reading from the address at F1 to F1+M-1 (corresponding to the portion of file having been moved), and from F2+M to F2+L-1 (corresponding to the remaining portion of the original file which has not yet been moved). Inclusive counting is applicable here. Improved fail-safety, where any individual byte write can fail but the filesystem can be recovered, of the compacting of the filesystem is therefore provided.

FIG. 5(c) represents the final state of the file after compaction of File B. A new freespace block 214a is thus created after File B, whose length 214b is equal to the sum of the lengths of original freespace blocks 208a and 208b.

The sequencing of writes to keep the FS_FragmentIndex valid is as follows:

1. Read the entire existing file being moved into main memory (the RAM of the HSM), and set M initially set to 0 in FS_FragMoved0;
2. Update the lowest-address free space block header to be ETYPE_FRAGMENT and with its own length (updated as usual with ETYPE_UNCOMMITTED_LENGTH as an intermediate state) pointing to the next block header after the file being moved (i.e. the fragment will represent the entirety of the address range containing both the original file and the free space it is being moved into);
3. Loop on the following until M==L:
   i. Write the next MIN(Off, L-M) bytes of the file starting at address F1+M;
   ii. Update M in the FS_FragmentIndex to reflect the data copied atomically as follows:
      a. If the previous M value was stored in FS_FragMoved0, write the new M value to FS_FragMoved1 then set the ETYPE_FRAGMOVED1 flag on the ETYPE_FRAGMENT Entry_Type.
      b. If the previous M value was stored in FS_Fragmoved1, write the new M value to FS_FragMoved0 then clear the ETYPE_FRAGMOVED1 flag on the ETYPE_FRAGMENT Entry_Type.
   iii. Optionally: If storage-specific remanence-resistant erasure operations are to be performed, other than overwrite or zeroization, then those remanence-resistant erasure operations are applied to the portion of storage from which file bytes have just been copied at this point.
4. When the file move completes:
  i. Write a new ETYPE_FREESPACE entry at F1+L; Optionally: overwrite the remaining space in the ETYPE_FRAGMENT after the ETYPE_FREESPACE block header (i.e. F1+L+1+LEN_SIZE to F2+L−1 inclusive) with zeroes;
  ii. resize the ETYPE_FRAGMENT to the actual file length (using ETYPE_UNCOMMITTED_LENGTH as an intermediate state);
  iii. update the Entry_Type of the ETYPE_FRAGMENT to the entry's original Entry_Type, which is read from FS_FragCode.

According to step 3(i) above, writing at most Off bytes at once means that the entire file data is always present on the token. This has the benefit that the start of the data not yet moved is never overwritten by the data that has been moved.

In particular, if free space 208a has length 40 and File_B has length 60, File_B is bigger than the free-space block that it's to be moved into. This means that if all of File_B is written starting at the start of free space 208a, it would be overwriting the start of the original File_B data as well. This means that if the write were interrupted after overwriting some of the original File_B data but before updating the Fragment Index to indicate how far, the start of File_B's data would be corrupted, as there would be no way for a recovery operation to know how much of File_B had been moved so far. Therefore File_B is split up into chunks so that at no point does the move overwrite data that would be considered to be part of the file were the compacting to be interrupted and need to be recovered. If the free space is sufficient to move the whole file in one go, then the algorithm will do that, as the minimum of the offset and (L-M) will be exactly L when M is initially 0 and the offset is greater than equal to L.

Corresponding to FIG. 5(c), block 214a is the new ETYPE_FREESPACE entry, which begins at F1+L. The block corresponding to the fragment 212 in FIG. 5(b) is resized in step 4(ii) to the correct file length (L).

Optionally, in step 4(i), a step of overwriting the remaining space in the ETYPE_FRAGMENT is performed to address a case where remnants of files that were moved during compaction and later erased might remain on storage. By including this step, the compaction algorithm ensures that the storage from which the files were moved is zeroized.

Step 3(iii) may optionally be included to address a case where remnants of files that are moved during compaction and later zeroed or overwritten might remain on storage. This step is included so that the storage from which the files were moved is given any applicable storage-specific remanence resistance measures.

Filesystem Check and Recovery

When performing an access operation on the device, a filesystem check and recovery procedure is first performed. Generally, before performing any read or write operation on the filesystem, a filesystem check is automatically performed. This is to determine whether an interruption to a transaction had previously occurred, which had left the filesystem in an intermediate state.

FIG. 7 shows a method of performing an access operation on a device in accordance with an embodiment.

The check is performed as follows:
  i. The FS_Type is read and checked to be a valid value; if FS_Type is not a valid value, an error is returned (as has been described above, during formatting, the FS_Type is actively zeroed, in order to indicate an invalid filesystem—this is updated to indicate a valid filesystem once formatting is complete);
  ii. If the FSTYPE_DIRTY flag is not set, the check may now be terminated. Optionally, an implementation may continue to perform an integrity check to validate that all entries in the filesystem contain valid Entry_Type values, and valid embedded lengths in Entry_Len and Entry_NameLen. Thus in S701, it is determined whether the FSTYPE_DIRTY flag is set.
  iii. The check iterates through each file entry header noting the presence of any Entry_Type Of ETYPE_FRAGMENT, ETYPE_UNCOMMITTED_FREESPACE, ETYPE_UNCOMMITTED_FILE or ETYPE_UNCOMMITTED_ERASE, and any ETYPE_UNCOMMITTED_LENGTH flag. Thus in S702, it is determined whether there are any file entries having a uncommitted file type (ETYPE_UNCOMMITTED_FILE). It is also determined whether there are any file entries having a ETYPE_FRAGMENT, ETYPE_UNCOMMITTED_FREESPACE, ETYPE_UNCOMMITTED_FILE or ETYPE_UNCOMMITTED_ERASE, and ETYPE_UNCOMMITTED_LENGTH type.

The repair functionality is executed in the following way:
  i. If the ETYPE_UNCOMMITTED_LENGTH flag is present in the Entry_Type Of any entry, the Entry_Len is updated with the length read from FS_Len2, and the ETYPE_UNCOMMITTED_LENGTH flag is subsequently unset.
  ii. If an ETYPE_FRAGMENT is found, and M (moved data count) in FS_FragMoved0 (or FS_FragMoved1 if ETYPE_FRAGMOVED1 flag is set) is non-zero, the compaction process is completed for the file.
  iii. If FSTYPE_COMMITTED is set in FS_Type, the commit process will be completed by rolling forward the transaction. Thus in S703 it is determined whether the FSTYPE_COMMITTED flag is set in FS_Type. The roll forward of the transaction proceeds in S704 as follows:
    a. Any ETYPE_FILE entries with filenames matching those of ETYPE_UNCOMMITTED_FILE entries are erased as per the safe erasure algorithm;
    b. any ETYPE_UNCOMMITTED_FILE Entry_Type entries are updated to ETYPE_FILE;
    c. any ETYPE_UNCOMMITTED_ERASE files are erased as per the safe erasure algorithm.
  iv. If FSTYPE_COMMITTED is not set in FS_Type, the transaction will be rolled back in S705 as follows:
    a. Any ETYPE_UNCOMMITTED_FILE entry will be erased as per the safe erasure algorithm;
    b. any ETYPE_UNCOMMITTED_ERASE entry will be restored to ETYPE_FILE.
  v. Any ETYPE_UNCOMITTED_FREESPACE entries are erased as per the safe erasure algorithm.

As in the compaction process, in step ii above, F1 is the start of the data section of the ETYPE_FRAGMENT file, L (original file length) is the fragment block's data length minus Off, and F2 is F1+Off.

Recovery from failures during recovery is also provided by the above method.

In the above described embodiment, various example methods have been described. However, these have been presented by way of example only, and the skilled person would understand that various omissions, substitutions and changes in the methods may be made.

For example, in the above description, a filesystem header is included in the filesystem, as shown in Table 1a. The filesystem header stores various flags. However, the filesystem header may be omitted. The flag used to indicate a transaction is in progress may be omitted. In this case, the check of this flag is simply omitted during the recovery stage. Furthermore, the flag used to indicate whether the filesystem is formatted may also be omitted. Again, this check is simply omitted during the recovery stage.

Instead of a flag in the filesystem header used to indicate a transaction as being committed, a committed file type may be introduced to indicate this information. In particular, an ETYPE_COMMITTED_FILE type may be introduced to flag a write transaction operation as being committed. During a write operation, when all the new files have been written as uncommitted type, the header typecode of each new file is then changed to ETYPE_COMMITTED_FILE in S109. All the original files with the same ID are then erased, and the typecode on the new files will now be changed to ETYPE_FILE. During a repair action, if any ETYPE_COMMITTED_FILE is found, the commit process will be completed. If there are ETYPE_UNCOMMITTED_FILE files present, then it is supposed that interruption occurred after all the new files were written (because there was a file with a COMMITTED typecode set) and so all uncommitted files are changed to ETYPE_COMMITTED_FILE. Any ETYPE_ FILE with ID duplicating any ETYPE_COMMITTED_FILE is then erased. Any ETYPE_COMMITTED_FILE typecodes are then updated to ETYPE_FILE typecodes. If no COMMITTED files are found during a repair action, ETYPE_UNCOMMITTED_FILEs are simply erased.

Erasure of files may be performed by (effectively) doing the file write steps backwards. This means that a transaction operation with new/updated files must be performed separately to a transaction operation with erasures to allow them to be distinguished for recovery purposes when rolling back or rolling forward an interrupted transaction. Firstly, all ETYPE_FILE typecodes of files to be erased are updated to ETYPE_COMMITTED_FILE. Then, each of these files are downgraded to ETYPE_UNCOMMITTED_FILE. Finally all the uncommitted files are erased. This is essentially the reverse of what the write operation does when committing a set of files, and shares the same recovery code.

An ETYPE_FRAGMENT INDEX entry may be created on-the-fly to record the state of a compaction operation, i.e. to store the compaction information which is described above as being stored in the filesystem header. Free-space entries may have space reserved in their header for the alternate length, and the alternate length for fragments may be stored in the fragment index.

In the above description, various file types are described. These file types are not exhaustive, and additional file types could be included. For example, separate private and user files could be included, where private files comprise files that are readable only internally by the HSM and invisible to users, and user files that are readable by users of the HSM, subject to suitable access controls. Alternatively, this could be implemented in the variable-length file name with suitable naming conventions, instead of including separate file types.

The concept of persistent and non-persistent files types could be introduced with an ETYPE_PERSIST flag on Entry_Type (alternatively, such distinctions could be encoded into the file name if desired). An operation to delete all non-persistent files as a single transaction could be included. Such a call will fail if the file system is invalid. If such a call is interrupted, when the filesystem is read again it will either be rolled-back to the original state with all the non-persistent files as well as the persistent files still present, or rolled-forward to the intended state with only the persistent files. This operation erases all files that do not have an ETYPE_PERSIST flag set. Firstly all ETYPE_FILE typecodes of non-persistent files are updated to ETYPE_COMMITTED_FILE. Then each of these files are downgraded to ETYPE_UNCOMMITTED_FILE. Finally all the uncommitted files are erased.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A method of performing a file transaction, the method comprising:
   providing a transaction instruction to perform a set of one or more transaction operations on a device;
   responsive to determining the transaction instruction comprises one or more write transaction operations, wherein the one or more write transaction operations collectively relate to a first file group comprising at least one file object, the first file group has a first size, and each of the at least one file objects comprises identification information, if the first size does not exceed available device storage:
      writing each of the at least one file objects with an uncommitted file type, wherein writing a file object with an uncommitted file type comprises:
         storing a length of the file object in a first location;
         updating an entry type of a block of freespace to indicate an uncommitted file entry length;
         updating a header of the block of freespace with the length of the file object;
         updating the entry type of the block of freespace to indicate an uncommitted file type; and
         writing data from the file object to the freespace block;
      after the first file group is written, storing transaction information on the device storage indicating that the transaction is committed;
   responsive to determining that one or more pre-existing file objects share identification information with any of the first file group, erasing the one or more pre-existing file objects; and
   after erasing the one or more pre-existing objects, updating the type of each of the at least one file objects in the first file group to a finalised type.

2. The method according to claim 1, wherein storing the transaction information indicating that the transaction is committed comprises setting a committed flag, and wherein the method further comprises clearing the committed flag after the type of each of the at least one file objects is updated to a finalised type.

3. The method according to claim 1, wherein storing the transaction information indicating that the transaction is committed comprises updating the type of each of the at least one file objects to a committed type.

4. The method according to claim 1, wherein erasing the one or more of the pre-existing file objects comprises:
   updating an entry type of the pre-existing file object to indicate an uncommitted freespace type,
   overwriting the pre-existing file object with zeros; and
   updating the entry type to indicate a freespace type.

5. The method according to claim 1, wherein writing a file object with an uncommitted file type comprises searching for any freespace blocks having a size greater than or equal to the file object, responsive to finding two or more freespace blocks, selecting the free space block having the least excess available space which, when written to, would not result in a remaining space block below a minimum size.

6. The method according to claim 5, further comprising, responsive to finding no freespace blocks, performing a compaction method comprising:
 moving a pre-existing file object of length L;
 storing information specifying an entry type of the entry being moved, the offset of the original start, F2, of the entry data relative to the new start, F1, of the entry, and the length of data which has been successfully moved, M, where M is initially set to zero;
 wherein moving the pre-existing file comprises:
  i. writing the next X bytes of the entry starting at address F1+M, where X is the minimum chosen from: the offset and (L-M),
  ii. updating the value of M;
  iii. set M=M+X and repeat steps i to iii until M is equal to L.

7. The method according to claim 1, further comprising:
 performing a first determination of whether there is sufficient space to write a file object;
 responsive to determining that there is sufficient space to write the file object, writing the file object;
 responsive to determining that there is not sufficient space to write the file object:
  storing transaction information on the device indicating that a transaction is committed;
  determining whether any pre-existing file objects share identification information with any of first file group which have been written with an uncommitted file type, and responsive to determining that one or more pre-existing file objects share identification information, erasing the one or more of the pre-existing file objects;
  performing a second determination of whether there is sufficient space to write the file object;
  responsive to determining that there is sufficient space to write the file object in the second determination, writing the file object.

8. The method according to claim 7, further comprising:
 responsive to determining that there is not sufficient space to write the file object in the second determination:
  determining whether any pre-existing file object shares identification information with the file object, and responsive to determining that a pre-existing file object shares identification information, erasing the pre-existing file object;
  writing the file object.

9. A method according to claim 1, further comprising:
 responsive to determining that the transaction instruction comprises one or more erase transaction operations, the one or more erase transaction operations collectively relating to a second file group to be erased from the device storage, the second file group comprising at least one file object, updating each of the at least one file objects in the second file group to an uncommitted erase type; and
 after the second file group is updated to an uncommitted erase type, storing transaction information on the device indicating that a transaction is committed;
 erasing the first file group.

10. A method of performing an access operation, the method comprising:
 determining whether a device stores transaction information indicating that a transaction is committed;
 determining whether there are any file objects having an uncommitted file type;
 responsive to determining that the device stores transaction information indicating that a transaction is committed and there are one or more file objects having an uncommitted file type:
  responsive to determining that the one or more pre-existing file objects share identification information with any of the one or more files having an uncommitted file type, erasing the one or more of the pre-existing file objects; and
  updating the type of the one or more file objects having an uncommitted file type to a finalised type;
 responsive to determining that the device does not store transaction information indicating that a transaction is committed and there are one or more file objects having an uncommitted file type, erasing the files having an uncommitted file type; and
 responsive to determining that there is an entry comprising an entry type indicating an uncommitted file entry length, updating a header of the entry with a length stored in a first location and updating the entry type.

11. A non-transitory data carrier carrying processor control code to, when running, cause a computer to perform the method of claim 1.

12. A device, comprising:
 one or more processors configured to:
  provide a transaction instruction to perform a set of one or more transaction operations on a device storage located on the device or on another device;
  responsive to determining the transaction instruction comprises one or more write transaction operations, wherein the one or more write transaction operations collectively relate to a first file group comprising at least one file object, the first file group has a first size, and each of the at least one file objects comprises identification information, if the first size does not exceed the available device storage:
   write each of the at least one file objects with an uncommitted file type, wherein writing a file object with an uncommitted file type comprises:
    storing a length of the file object in a first location;
    updating an entry type of a block of freespace to indicate an uncommitted file entry length;
    updating a header of the block of freespace with the length of the file object;
    updating the entry type of the block of freespace to indicate an uncommitted file type; and
    writing data from the file object to the freespace block;
   after the first file group is written, store transaction information on the device storage indicating that the transaction is committed;
   responsive to determining that one or more pre-existing file objects share identification information with any of the first file group, erase the one or more pre-existing file objects; and
  after erasing the one or more pre-existing file objects, update the type of each of the at least one file objects in the first file group to a finalised type.

13. A device, comprising:
one or more processors configured to:
- determine whether a device storage stores transaction information indicating that a transaction is committed, wherein the device storage is located on the device or on another device;
- determine whether there are any file objects having an uncommitted file type in the device storage;
- responsive to determining that the device storage stores transaction information indicating that a transaction is committed and there are one or more file objects having an uncommitted file type;
  - responsive to determining that one or more pre-existing file objects share identification information with any of the one or more files having an uncommitted file type, erase the one or more of the pre-existing objects; and
  - update the type of the one or more file objects having an uncommitted file type to a finalised type;
- responsive to determining that the device storage does not store transaction information indicating that a transaction is committed and there are one or more file objects having an uncommitted file type, erase the files having an uncommitted file type; and
- responsive to determining that there is an entry comprising an entry type indicating an uncommitted file entry length, updating a header of the entry with a length stored in a first location and updating the entry type.

14. A system, comprising the device of claim 12 and another device, wherein the device storage is located on the another device.

15. A system, comprising the device of claim 13 and another device, wherein the device storage is located on the another device.

* * * * *